United States Patent
Takata

(10) Patent No.: US 9,601,927 B2
(45) Date of Patent: Mar. 21, 2017

(54) ELECTRONIC CONTROL DEVICE

(71) Applicant: Mitsubishi Electric Corporation, Chiyoda-ku, Tokyo (JP)

(72) Inventor: Michihiro Takata, Chiyoda-Ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 517 days.

(21) Appl. No.: 14/155,839

(22) Filed: Jan. 15, 2014

(65) Prior Publication Data
US 2015/0061391 A1   Mar. 5, 2015

(30) Foreign Application Priority Data
Sep. 2, 2013 (JP) .................... 2013-180860

(51) Int. Cl.
H02J 4/00 (2006.01)
G06F 1/28 (2006.01)

(52) U.S. Cl.
CPC .................. *H02J 4/00* (2013.01); *G06F 1/28* (2013.01); *Y10T 307/549* (2015.04)

(58) Field of Classification Search
CPC ........... G06F 1/28; H02J 4/00; Y10T 307/549
USPC .......................................................... 307/52
See application file for complete search history.

(56) References Cited

U.S. PATENT DOCUMENTS

| | | | | |
|---|---|---|---|---|
| 2007/0016337 A1* | 1/2007 | Iwagami | ................. | B60R 16/03 701/1 |
| 2008/0309163 A1* | 12/2008 | Hashimoto | ........... | H02J 7/0029 307/31 |
| 2009/0070514 A1* | 3/2009 | Moriyama | ........... | G05B 19/054 710/311 |
| 2009/0316320 A1* | 12/2009 | Maeda | .................... | B60R 16/03 361/92 |
| 2012/0292988 A1* | 11/2012 | Nishida | .................. | B60R 16/03 307/10.1 |
| 2014/0365839 A1* | 12/2014 | Iwagami | ........ | G01R 31/318544 714/727 |

FOREIGN PATENT DOCUMENTS

| | | |
|---|---|---|
| DE | 102008027591 A1 | 12/2008 |
| JP | 09-027749 A | 1/1997 |
| JP | 11215686 A | 8/1999 |

(Continued)

OTHER PUBLICATIONS

Translation of JP-2010233425.*

(Continued)

*Primary Examiner* — Rexford Barnie
*Assistant Examiner* — Elim Ortiz
(74) *Attorney, Agent, or Firm* — Sughrue Mion, PLLC; Richard C. Turner

(57) ABSTRACT

A first output voltage of a constant-voltage power supply is applied as a reference voltage of a multi-channel A-to-D converter and a monitor signal obtained by smoothing the first output voltage by a first power-supply filter is inputted as an input signal voltage. A micro-processor periodically writes digital conversion data of the monitor signal into shift registers to calculate a maximum deviation using a maximum value and a minimum value of the latest predetermined number of data, and determines a power-supply abnormality when the maximum deviation exceeds a predetermined threshold value.

7 Claims, 10 Drawing Sheets

(56) References Cited

FOREIGN PATENT DOCUMENTS

| JP | 2009-022152 A | | 1/2009 |
|---|---|---|---|
| JP | 2010233425 A | * | 10/2010 |
| JP | 2010259178 A | | 11/2010 |

OTHER PUBLICATIONS

Communication dated Feb. 3, 2015, issued by the Japanese Patent Office in counterpart Application No. 2013180860.
Communication dated Apr. 13, 2016, issued by the German Patent and Trademark Office in counterpart German Application No. 102014206292.6.

* cited by examiner

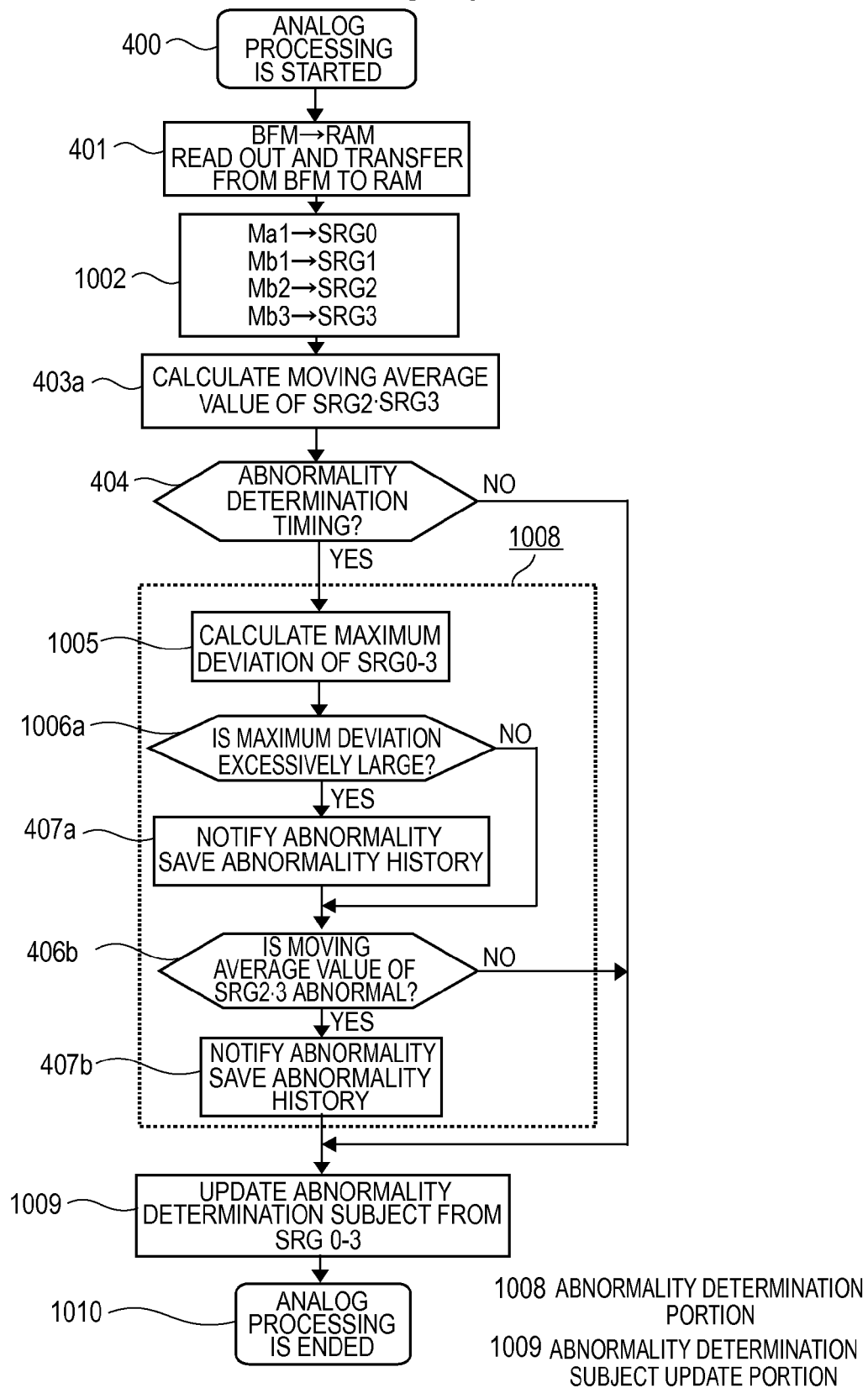

ELECTRONIC CONTROL DEVICE

BACKGROUND OF THE INVENTION

Field of the Invention

The present invention relates to an electronic control device equipped with a micro-processor and a multi-channel A-to-D converter both fed from a constant-voltage power supply, and more particularly, to an electronic control device improved so as to constantly monitor the presence or absence of a power-supply abnormality in a constant-voltage power supply.

Description of the Related Art

As in-vehicle electronic control devices for automobile, there is a voltage monitor device equipped with a micro-processor that monitors a variation of a digital conversion value by monitoring a power-supply voltage to be fed to a reference power-supply terminal of an A-to-D converter.

For example, JP-A-09-027749 (Patent Document 1) (see FIG. 1) discloses a voltage monitor device including a circuit (resistor 1 and zener diode 2) that generates a constant voltage Vz from an analog input voltage (for example, Vcc) to be monitored in such a manner that the constant voltage Vz has a lower value than the analog input voltage, an A-to-D converter 3, and further a CPU 4 that monitors a variation of a digital value outputted from the A-to-D converter 3 connected inversely to a normal use of an A-to-D converter in such a manner that the analog input voltage to be monitored is given to a reference voltage terminal 3s and the constant voltage Vz is given to an analog input terminal 3a. According to this voltage monitor device, it becomes possible to provide a device that not only makes it possible to monitor a voltage variation accurately, but also makes it easy to change a comparative voltage.

Also, JP-A-2009-022152 (Patent Document 2) (see FIG. 14) discloses a constant-voltage power supply for in-vehicle electronic control device having multiple types of stabilized output voltages and configured to perform comprehensive abnormality processing by detecting the presence or absence of an abnormality in each output voltage. In order to perform comprehensive abnormality processing by detecting the presence or absence of an abnormality in each output voltage, the constant-voltage power supply generates an output voltage Vad of 5 V as a high-accurate low-capacity power supply, an output voltage Vif of 5 V as a low-accurate high-capacity power supply, and an output voltage Vcp of 3.3 V as a low-accurate high-capacity power supply. Further, the constant-voltage power supply generates at least one of an output voltage Vup of 2.8 V as a low-accurate low-capacity power supply and an output voltage Vsb of 3.3 V as a high-accurate low-capacity power supply. A determination signal input circuit compares a divided voltage of the output voltage Vif, a divided voltage of the output voltage Vcp, a divided voltage of the output voltage Vup, and a divided voltage of the output voltage Vsb in reference, for example, to a divided voltage of the output voltage Vad. The determination signal input circuit then processes the comparison results by logic synthesis and inputs relative voltage information ER2, ER3, ER4, and ER5 into the micro-processor. The micro-processor makes a comprehensive determination including the comparative reference voltage on the basis of the relative voltage information and notifies an abnormality or saves abnormality occurrence information. The reference numerals and the signs used above are those used in respective Patent Documents.

[Patent Document 1] JP-A-09-027749 (Abstract and FIG. 1)

[Patent Document 2] JP-A-2009-022152 (Abstract and FIG. 14)

According to the voltage monitor device disclosed in Patent Document 1, by configuring in such a manner that the analog input voltage to be monitored is given to the reference voltage terminal and the constant voltage (reference voltage) is given to the analog input terminal, the constant voltage used as the reference voltage can take a lower value than the analog input voltage to be monitored. Hence, the constant voltage can be generated easily from the analog input voltage (for example, power-supply voltage Vcc) to be monitored using a simple circuit, such as a zener diode.

However, voltage characteristics vary from one zener diode to another and the reference voltage to be monitored varies in a similar manner. Hence, the obtained result is too uncertain to make a determination as to which one is correct. In order to make the obtained result certain, temperature characteristics have to be corrected beforehand so as to accommodate a change of the environmental temperature in a broad range by performing an initial calibration corresponding to characteristics of an actual zener diode. Hence, there is a problem that the constant voltage (reference voltage) is by no means inexpensive.

According to the in-vehicle electronic control device disclosed in Patent Document 2, an output voltage of the constant-voltage power-supply circuit having a high degree of output voltage accuracy among multiple constant-voltage power-supply circuits is used as the comparative reference voltage. The presence or absence of an individual abnormality is detected by a band comparison as to whether output voltages of multiple constant-voltage power-supply circuits are within an allowable variation range. Hence, when the high-accurate voltage used as the comparative reference has a pulsation variation, a relative comparison becomes difficult. In such a case, there arises a problem that not only an accurate abnormality determination cannot be made, but also magnitude of the pulsation variation cannot be understood quantitatively.

SUMMARY OF THE INVENTION

A first object of the invention is to obtain an electronic control device of an inexpensive configuration that does not require a high-accurate reference voltage used as a determination reference or initial calibration processing thereof in order to determine an abnormality in an output voltage of a constant-voltage power supply.

A second object of the invention is to obtain an electronic control device of an inexpensive configuration capable of detecting a pulsation component of an output voltage quantitatively in order to detect generation of a voltage ripple as a sign of a power-supply abnormality.

An electronic control device according to an aspect of the invention includes: a constant-voltage power supply having a constant-voltage control circuit portion that distributes and feeds or divides and feeds a first output voltage or a second output voltage among multiple output voltages, each of which is fed to a different subject, by an input power-supply voltage fed from an outside power supply; and a main control circuit portion having a multi-channel A-to-D converter fed by the first output voltage having a highest degree of accuracy among the multiple output voltages, and a micro-processor, a program memory, and a RAM memory fed by the second output voltage, all of which cooperate to drive an electronic load group under control in response to an operation condition of a switch sensor group and an analog sensor group.

The multi-channel A-to-D converter generates a digital output in proportion to a ratio of a reference voltage applied to a reference voltage terminal and an input signal voltage and, when the ratio is 1, generates a maximum digital output, $2^n-1$, according to an n-bit resolution, where n is a predetermined number.

Also, the first output voltage is applied to the reference voltage terminal as a reference voltage and a smoothed power-supply monitor signal to be used as a power-supply monitor voltage is inputted as one of input signal voltages of the multi-channel A-to-D converter, or a voltage is applied to the reference voltage terminal from the first output voltage as the reference voltage by suppressing a pulsation component via a reference power-supply filter and an unsmoothed power-supply monitor signal to be used as the power-supply monitor voltage is inputted as one of the input signal voltages of the multi-channel A-to-D converter.

The smoothed power-supply monitor signal is a smoothed voltage obtained from a divided voltage of the first output voltage by suppressing a pulsation component via the first power-supply filter, and a dividing ratio of the divided voltage is set so that the smoothed voltage takes a value not greater than a lowest value of a pulsation of the reference voltage.

The unsmoothed power-supply monitor signal is a divided voltage of the first output voltage and a dividing ratio of the divided voltage is set so that the divided voltage takes a value not greater than the lowest value of the pulsation of the reference voltage.

The micro-processor cooperates with the program memory and periodically inputs a digital conversion value of the smoothed power-supply monitor signal or the unsmoothed power-supply monitor signal into a shift register formed of the RAM memory to calculate a maximum deviation, which is a deviation between a maximum value and a minimum value of a latest predetermined number of digital conversion values, and determines an abnormality in the constant-voltage power supply in a case where the calculated maximum deviation exceeds a predetermined threshold value.

According to the electronic control device of the invention configured as above, the first output voltage, which is an output voltage having the highest degree of accuracy among the multiple output voltages by the constant-voltage power supply or a divided voltage thereof, is applied to one of the reference voltage terminal and an analog input terminal of the multi-channel A-to-D converter, and a smoothed voltage or a divided voltage of the first output voltage is applied to the other. A pulsation deviation voltage of the first output voltage is calculated from the digital conversion values obtained by making one of the applied voltages as a smoothed voltage and the other as an unsmoothed voltage to determine the presence or absence of an abnormality in the constant-voltage power supply.

In order to determine whether accuracy of a high-accurate output voltage is appropriate or not, a comparative reference voltage with a higher degree of accuracy is required and it becomes difficult to obtain a comparative reference voltage at a low cost. However, given the fact that a pulsation variation is normally generated in an output voltage when an abnormality occurs in the constant-voltage power supply that was verifies to be normal by a first article inspection at the time of shipment, by detecting the occurrence of this pulsation variation, it becomes possible to detect the occurrence of an abnormality in the constant-voltage power supply.

Accordingly, by performing digital conversion according to the reference voltage or the power-supply monitor voltage including a pulsation component and the power-supply monitor voltage or the reference voltage whose pulsation component is smoothed, the obtained digital conversion value pulsates, so that a pulsation component of the first output voltage can be detected easily in the form of a digital value. Hence, there can be achieved an advantage that the occurrence of an abnormality can be detected quickly by constantly monitoring the presence or absence of an abnormality in the constant-voltage power supply by comparison with a predetermined threshold value.

Also, regarding the reference power-supply voltage and the power-supply monitor voltage, one is generated by smoothing the other and there is no need to prepare a new high-accurate comparative reference voltage. Hence, there can be achieved an advantage that an abnormality can be determined accurately by an inexpensive configuration.

The foregoing and other objects, features, aspects, and advantages of the present invention will become more apparent from the following detailed description of the present invention when taken conjunction with the accompanying drawings.

BRIEF DESCRIPTION OF THE DRAWINGS

FIG. 10 is a flowchart depicting an operation of the electronic control device according to the third embodiment of the invention.

DETAILED DESCRIPTION OF THE PREFERRED EMBODIMENTS

Figure 1:
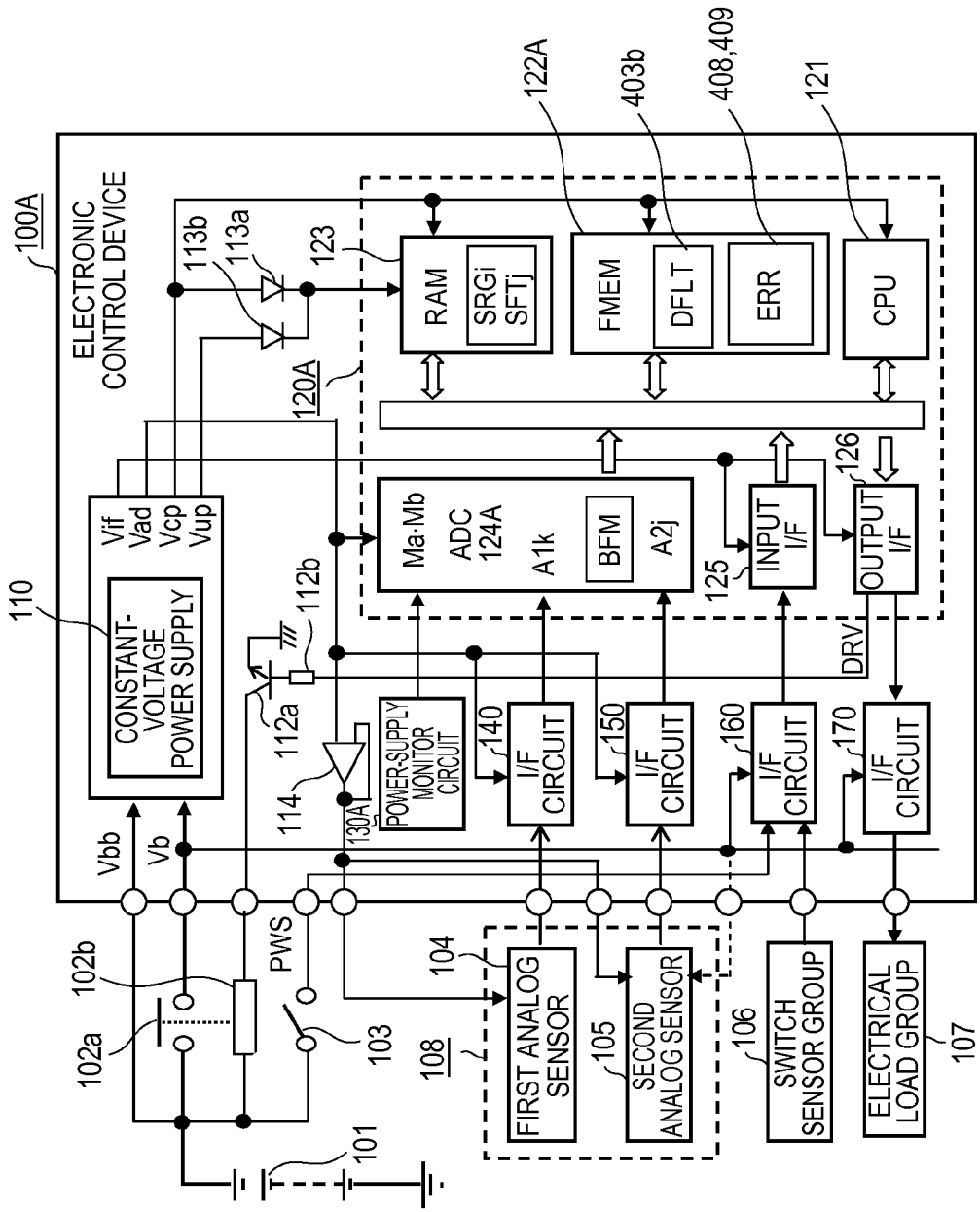
FIG. 1 is a view showing an overall configuration of an electronic control device according to a first embodiment of the invention.

Hereinafter, preferred embodiments of an electronic control device of the invention will be described using the drawings. Descriptions will be given by labeling same or equivalent portions with same reference numerals in the respective drawings.

First Embodiment

Firstly, a configuration of an electronic control device according to a first embodiment of the invention will be described in detail using an overall configuration view of FIG. 1 and a partial detailed circuit diagram of FIG. 2.

Referring to FIG. 1, an input power-supply voltage Vb is applied to an electronic control device 100A from an outside power supply 101, which is, for example, an in-vehicle battery, via an output contact 102a of a power-supply relay. Also, even when the output contact 102a is open, an auxiliary power-supply voltage Vbb for micro-power is directly applied to the electronic control device 100A from the outside power supply 101.

An exciting coil 102b of the power-supply relay is energized when an energization transistor 112a is brought into conduction and driven via an unillustrated base circuit by a power-supply switch signal PWS that reacts to a power-supply switch 103. The energization transistor 112a is controlled by the electronic control device 100A so that even when the power-supply switch 103 is opened, the energization transistor 112a continues to conduct via an energization resistor 112b by a self-hold command signal DRV generated by a micro-processor 121 described below and is de-energized with a delay of a predetermined time.

A first analog sensor 104, a second analog sensor 105, a switch sensor group 106, and an electrical load group 107 are connected to the electronic control device 100A. It should be noted that an analog sensor group 108 is formed of the first analog sensor 104 that operates on a first output voltage Vad described below as a power supply, a detection signal voltage of which as a sensor varies in proportion to a value of the first output voltage Vad, for example, like a potentiometer, and the second analog sensor 105 that operates on the input power-supply voltage Vb or the first output voltage Vad as a power supply, a detection signal voltage of which as a sensor is not influenced by a pulsation variation of the first output voltage Vad due to a high-accurate constant-voltage control circuit portion or constant-current control circuit portion included in the sensor.

A constant-voltage power supply 110 built in the electronic control device 100A generates first, second, and third output voltages Vad, Vcp, and Vif, which are stabilized voltages stepped-down from the input power-supply voltage Vb, and also generates a fourth output voltage Vup, which is a stabilized voltage stepped-down from the auxiliary power-supply voltage Vbb.

A main control circuit portion 120A is formed of a micro-processor 121, a program memory 122A, a computation processing RAM memory 123, a multi-channel A-to-D converter 124A, an input interface circuit 125, and an output interface circuit 126. These components are interconnected by a data bus.

The program memory 122A cooperates with the micro-processor 121 and is pre-installed with a control program run to realize a calibration processing portion 403b, an abnormality determination portion 408, and an abnormality determination subject update portion 409 described below with reference to FIG. 4.

The RAM memory 123 contains shift registers SRGi and SFTj described below and is fed from the second and fourth output voltages Vcp and Vup via diodes 113a and 113b, respectively. Power-supply monitor signals Ma1, Mb2, and Mb3 are inputted into the multi-channel A-to-D converter 124A from a power-supply monitor circuit 130A described below with reference to FIG. 2. Also, a first analog signal A1k is inputted from the first analog sensor 104 via a noise filter 140 and a second analog signal A2j is inputted from the second analog sensor 105 via a noise filter 150.

ON and OFF signals are inputted into the input interface circuit 125 from the switch sensor group 106 via a preceding-stage input interface circuit 160. The preceding-stage input interface circuit 160 operates on the input power-supply voltage Vb and is formed of a conversion circuit at a signal voltage level and a noise filter circuit. The electrical load group 107 is connected to the output interface circuit 126 via a subsequent-stage output interface circuit 170. The subsequent-stage output interface circuit 170 operates on the input power-supply voltage Vb and is formed of a power transistor circuit that performs conversion at a signal voltage level.

The first output voltage Vad is a high-accurate low-capacity power supply, for example, of DC 5 V±20 mV/20 mA and feeds a part of the multi-channel A-to-D converter 124A, the noise filters 140 and 150, and the first and second analog sensors 104 and 105. It should be noted, however, that a buffer amplifier 114 is connected in series to feed circuits for the first and second analog sensors 104 and 105 as a safeguard against a short circuit, and a part of the second analog sensor 105 operates on the input power-supply voltage Vb.

The second output voltage Vcp is a low-accurate high-capacity power supply, for example, of DC 3.3 V±0.3 V/500 mA and feeds the micro-processor 121, the program memory 122A, and the RAM memory 123.

The third output voltage Vif is a low-accurate high-capacity power supply, for example, of DC 5 V±0.2 V/200 mA and feeds the input interface circuit 125 and the output interface circuit 126.

The fourth output voltage Vup is a low-accurate low-capacity power supply, for example, of DC 3.3 V±0.3 V/20 mA and feeds the RAM memory 123 when the output contact 102a of the power-supply relay is open. These output voltages are divided and fed separately from unillustrated multiple constant-voltage control circuit portions provided in the constant-voltage power supply 110. The first output voltage Vad and the third output voltage Vif are same rated voltages at different degrees of output voltage accuracy. Hence, by setting the output voltage accuracy to a high degree, these output voltages can be distributed and fed from a single constant-voltage control circuit portion.

Also, in a case where the micro-processor 121 is a low-capacity memory operating at a low speed, DC 5 V is used as the second output voltage Vcp. In this case, the first output voltage Vad, the second output voltage Vcp, and the third output voltage Vif can be distributed and fed from a single constant-voltage control circuit portion.

Figure 2:
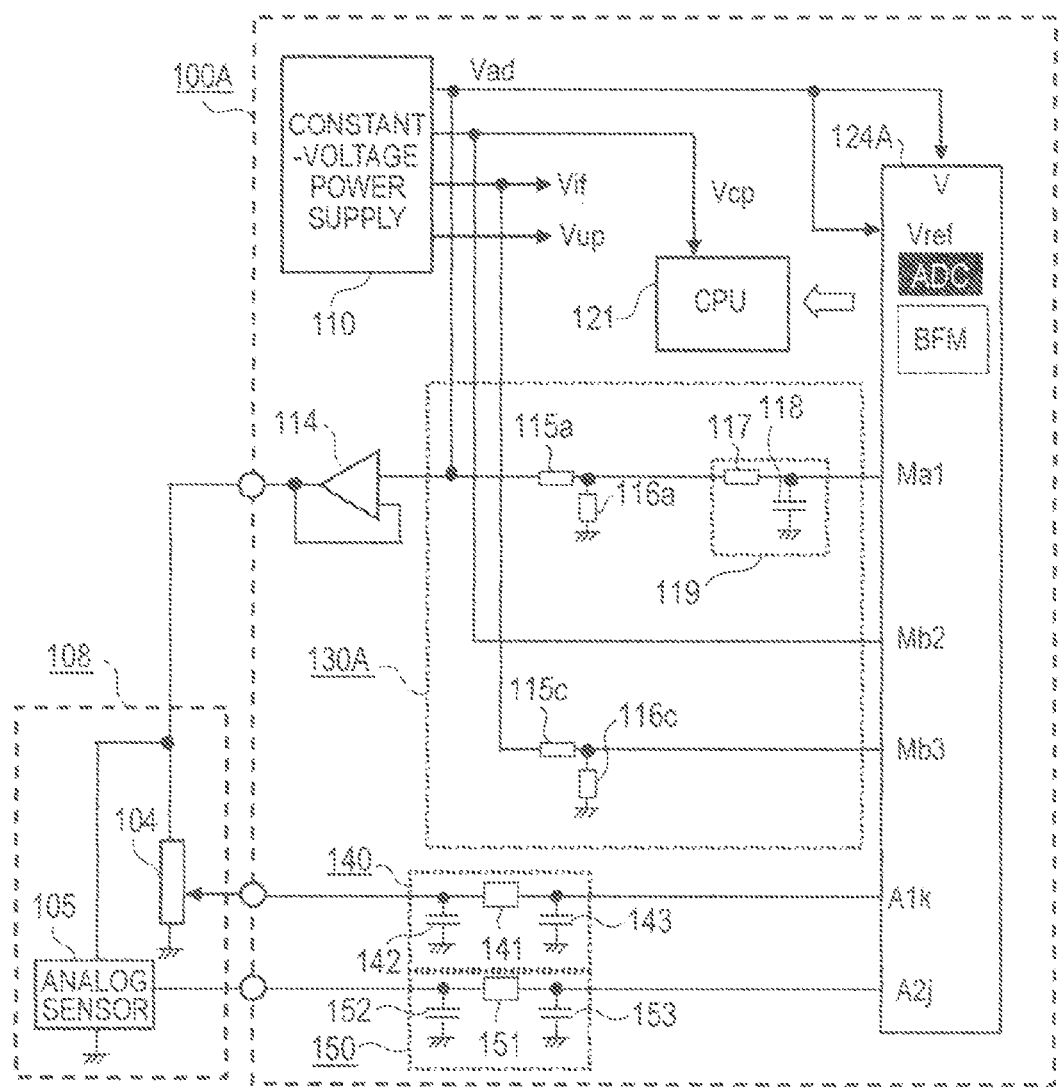
FIG. 2 is a partial detailed circuit diagram of the electronic control device according to the first embodiment of the invention.

Referring to FIG. 2, the first output voltage Vad is applied intact to the multi-channel A-to-D converter 124A as a power-supply voltage Vcc and a reference voltage Vref thereof. Also, the smoothed power-supply monitor signal Ma1, the second power-supply monitor signal Mb2, and the third power-supply monitor signal Mb3 generated by the power-supply monitor circuit 130A, and the first analog signal A1k and the second analog signal A2j outputted from the noise filters 140 and 150, respectively, are inputted into the multi-channel A-to-D converter 124A as input signals thereof.

The smoothed power-supply monitor signal Ma1 is a signal obtained from the first output voltage Vad via dividing resistors 115a and 116a and a first power-supply filter 119.

The first power-supply filter 119 is formed of a smoothing resistor 117 and a smoothing capacitor 118.

The second output voltage Vcp is connected intact as the second power-supply monitor signal Mb2. The third power-supply monitor signal Mb3 is a signal obtained from the third output voltage Vif via dividing resistors 115c and 116c.

The first analog signal A1k includes multiple analog signals obtained from the first analog sensor 104 via the noise filter 140. The noise filter 140 is formed of a bypass capacitor 142 to block a foreign high-frequency noise, an input resistor 141, and an output-end capacitor 143.

The second analog signal A2j includes multiple analog signals obtained from the second analog sensor 105 via the noise filter 150. The noise filter 150 is formed of a bypass capacitor 152 to block a foreign high-frequency noise, an input resistor 151, and an output-end capacitor 153. The multi-channel A-to-D converter 124A generates a digital output in proportion to a ratio of the reference voltage Vref applied to the reference voltage terminal with respect to an input signal voltage Vin, such as the smoothed power-supply monitor signal Ma1, the second power-supply monitor signal Mb2, the third power-supply monitor signal Mb3, the first analog signal A1k, and the second analog signal A2j, Vin/Vref. When Vin/Vref=1, the multi-channel A-to-D converter 124A generates a full-scale digital output, Dout=$2^n$−1, according to an n-bit resolution, where n is a predetermined number. Hence, given a 10-bit resolution, then we obtain Dout=1023. Accordingly, when the reference voltage Vref is DC 5 V, 5 mV can be identified as a minimum unit of the input signal voltage Vin.

Figure 3:
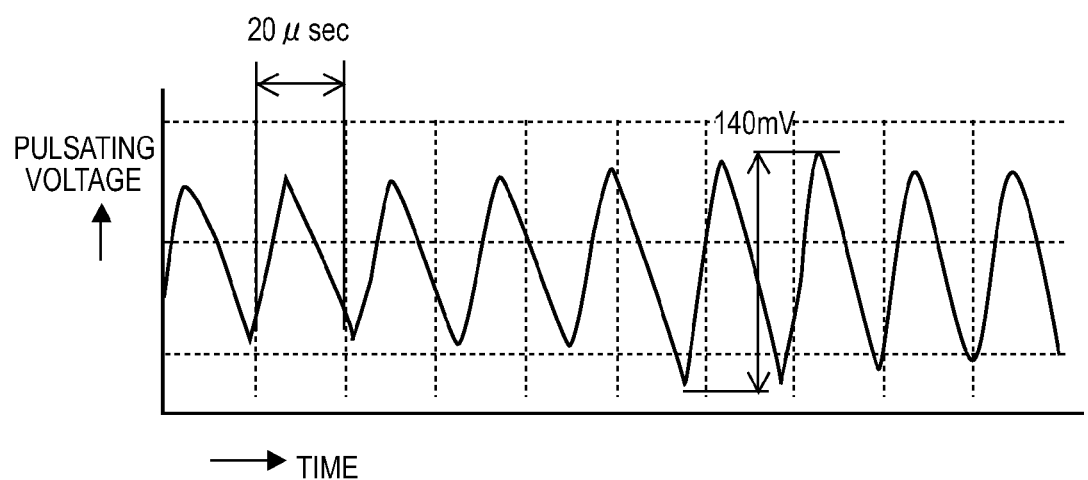
FIG. 3 is a characteristic diagram of an abnormal voltage waveform of the electronic control device according to the first embodiment of the invention.

FIG. 3 is a characteristic diagram of an abnormal voltage waveform of the electronic control device 100A. Referring to FIG. 3, the ordinate is used for an output voltage of the first output voltage Vad during the occurrence of an abnormality, and the abscissa is used for an elapsed time. It is understood from this abnormality characteristic waveform that the first output voltage Vad during the occurrence of an abnormality includes a pulsation component having a pulsation frequency of 50 KHz and a pulsation amplitude of ±70 mV.

The first output voltage Vad in a normal state maintains accuracy of DC 5 V±20 mV and is a stable low-amplitude low-frequency output voltage having a pulsation component of ±5 mV or less and a pulsation frequency of several Hz or lower.

As has been described, an output voltage waveform of the constant-voltage power supply 110 is a low-amplitude low-frequency pulsation output voltage in a normal state. However, the pulsation amplitude increases with a degree of the abnormal state and there is a tendency that the pulsation frequency becomes higher with an increase of the pulsation amplitude.

Meanwhile, a conversion required time for the multi-channel A-to-D converter 124A to convert one input signal voltage Vin to a digital form is, for example, 3 μsec, and digital conversion accuracy is deteriorated as the pulsation frequency becomes higher.

However, because the pulsation amplitude is also increased when the pulsation frequency is high, the multi-channel A-to-D converter 124A with a resolution of 5 mV can detect an abnormality occurring state in a reliable manner.

The noise filters 140 and 150 provided to input circuits of the first and second analog sensors 104 and 105, respectively, include the bypass capacitors 142 and 152, respectively, which not only suppress a noise signal of tens Hz to several KHz or higher generated in the analog input circuits, but also suppress a foreign high-frequency noise in a band of several MHz to tens MHz. A noise suppressing effect of a noise filter can be enhanced by increasing a smoothing time constant (that is, by lowering a break frequency) to the extent possible. However, on the other hand, responsivity as a sensor is deteriorated when the smoothing time constant is increased excessively (that is, when the break frequency is lowered excessively). Hence, a noise filter having a smoothing time constant increased (the break frequency lowered) to the extent possible within an allowable range of the responsivity as a sensor is adopted herein. Accordingly, in the case of the noise filter 140 for the first analog sensor 104, a low-pass filter having a first break frequency, for example, of 20 Hz is adopted and the same applies to the noise filter 150 for the second analog sensor 105.

A filter constant of the first power-supply filter 119 is to smooth a pulsation component of tens Hz to tens KHz or higher, which are pulsation frequencies when the first output voltage Vad is in an abnormal state, and the first power-supply filter 119 is a low-pass filter having a second break frequency, for example, of 10 Hz. The purpose of this configuration is to detect an abnormality quickly when a pulsation component is generated in the first output voltage Vad. Hence, it is crucial that at least the smoothing time constant of the noise filter 140 is smaller than the smoothing time constant of the first power-supply filter 119 and the first power-supply filter 119 outperforms the noise filter 140 in terms of the smoothing characteristics.

Figure 4:
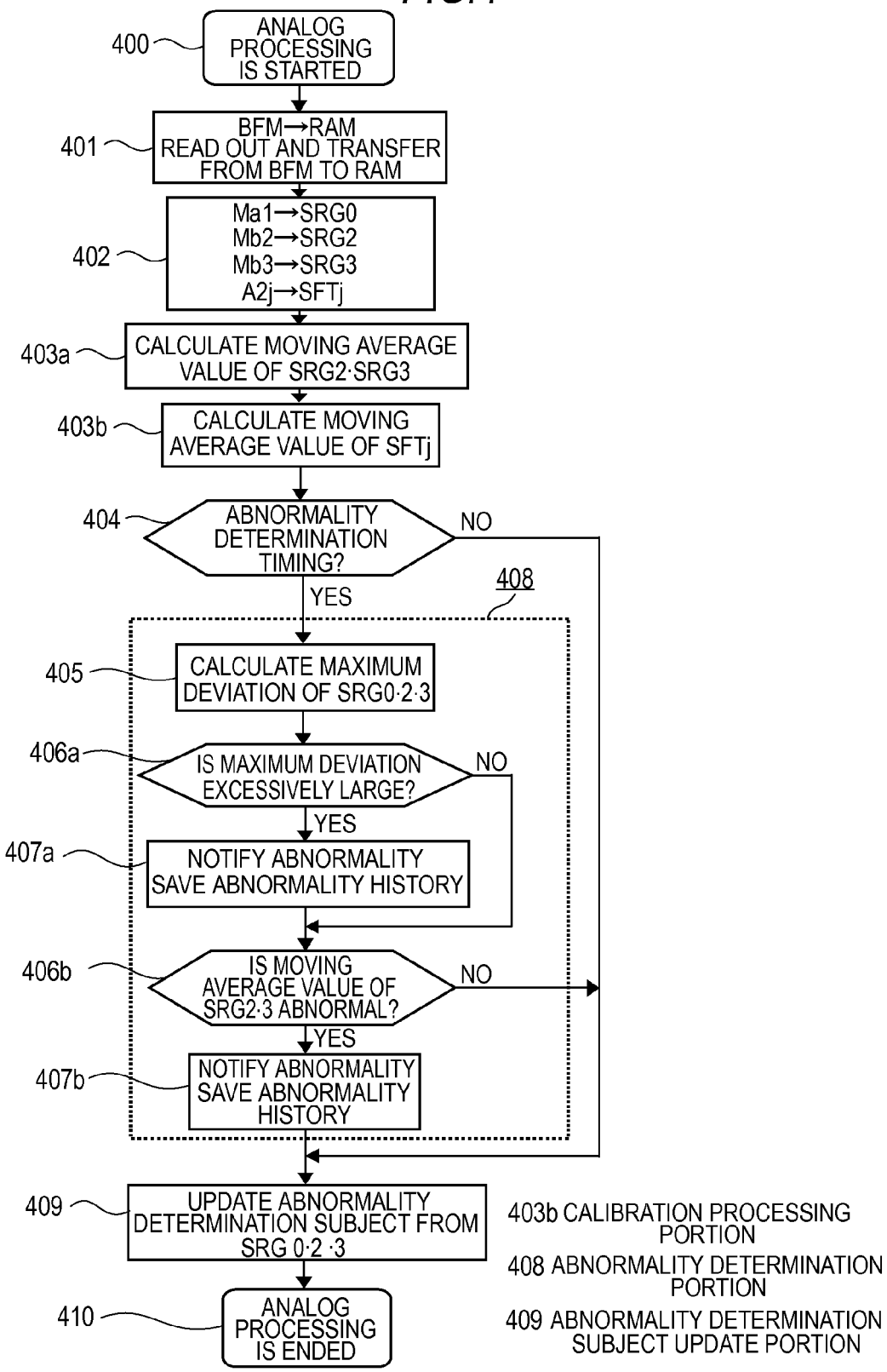
FIG. 4 is a flowchart depicting an operation of the electronic control device according to the first embodiment of the invention.

The electronic control device 100A of the first embodiment is configured as described above, and an operation and a function will now be described in detail according to the flowchart of FIG. 4 depicting the operation.

Firstly, referring to FIG. 1 and FIG. 2, when the power-supply switch 103 is closed and the output contact 102a of the power-supply relay is closed, the constant-voltage power supply 110 having one or more than one constant-voltage control circuit portions distributes and feeds or divides and feeds the first output voltage Vad, the second output voltage Vcp, or the third output voltage Vif, each of which is fed to a different subject, by the input power-supply voltage Vb fed from the outside power supply 101.

The micro-processor 121 starts to operate when the second output voltage Vcp rises and drives the electrical load group 107 under control in response to an operation state of the switch sensor group 106 and the analog sensor group 108 in cooperation with the program memory 122A and the multi-channel A-to-D converter 124A. It should be noted that the first output voltage Vad is applied intact to the power-supply terminal and the reference voltage terminal of the multi-channel A-to-D converter 124A.

Herein, the smoothed power-supply monitor signal Ma1 is obtained by smoothing the first output voltage Vad by the first power-supply filter 119. Because the reference voltage Vref of the multi-channel A-to-D converter 124A is the first output voltage Vad itself, when the first output voltage Vad is normal, the digital conversion value of the smoothed power-supply monitor signal Ma1 takes a constant value in proportion to a dividing ratio of the dividing resistors 115a and 116a. However, when the first output voltage Vad becomes abnormal and the pulsation component is generated, the reference voltage Vref pulsates whereas the digital conversion value of the smoothed power-supply monitor signal Ma1 undergoes increased or reduced pulsation because the smoothed power-supply monitor signal Ma1 is smoothed by the first power-supply filter 119 and a pulsation thereof is suppressed.

As will be described below with reference to FIG. 4, the micro-processor 121 determines the presence or absence of an abnormality in the first output voltage Vad by detecting this pulsation amplitude. It should be noted that a dividing ratio of the dividing resistors 115a and 116a is set so that a smoothed output voltage by the smoothed power-supply monitor signal Ma1 takes a value not greater than a minimum value of the first output voltage Vad that pulsates.

The second and third power-supply monitor signals Mb2 and Mb3 are power-supply monitor inputs to determine the presence or absence of an abnormality in the low-accurate second and third output voltages Vcp and Vif, respectively, in reference to the high-accurate first output voltage Vad operating normally. As will be described below with reference to FIG. 4, the micro-processor 121 determines the presence or absence of an abnormality in the second and third output voltages Vcp and Vif by monitoring average values and the pulsation amplitudes of the second and third power-supply monitor signals Mb2 and Mb3, respectively.

When the reference voltage Vref is normal or even when it is pulsating at a low frequency, the first analog signal A1k itself pulsates in proportion to a pulsation of the first output voltage Vad as long as the first analog signal A1k is in a low frequency region where the first analog signal A1k is not influenced by the noise filter 140. Hence, the digital conversion value does not pulsate and can take a value in proportion to a dividing ratio by the first analog sensor 104, which is a potentiometer. When the pulsation frequency of the first output voltage Vad becomes higher, the first analog signal A1k is smoothed by the noise filter 140 whereas the reference voltage Vref is unsmoothed. Hence, the digital conversion value of the first analog signal A1k undergoes increased or reduced pulsation and cannot take an exact dividing ratio. It should be noted, however, that under these conditions, an abnormality determination is made in advance by monitoring the smoothed power-supply monitor signal Ma1.

A signal voltage as a sensor can be obtained from the second analog signal A2j independently of a variation of the first output voltage Vad. There is, however, a problem that the digital conversion value thereof varies in inverse proportion to the reference voltage Vref when the reference voltage Vref of the multi-channel A-t-D converter 124A varies. To overcome this problem, a digital conversion value from which a pulsation component is removed is obtained in this embodiment by calculating a moving average value of the digital conversion values as will be described below with reference to FIG. 4.

Referring to FIG. 4, Step 400 is a step in which the micro-processor 121 starts to perform analog signal processing periodically in cycles of, for example, at least 10 msec. or shorter.

Subsequent Step 401 is a step in which a content of a buffer memory BFM, which is provided in the multi-channel A-to-D converter 124A and in which digital conversion values of various input signal voltages Vin are stored, is read out and transferred to a predetermined region in the RAM memory 123.

Subsequent Step 402 is a step in which the digital conversion values of the smoothed power-supply monitor signal Ma1, the second power-supply monitor signal Mb2, and the third power-supply monitor signal Mb3 are stored, respectively, in first through third FIFO tables formed of shift registers SRGi=SRG0, SRG2, and SRG3, and the digital conversion values of the second analog signal A2j (j=1, 2, and so on) are stored in multiple FIFO tables formed of shift registers SFTj=SFT1, SFT2, and so on. For example, up to sixteen 10-bit digital conversion values are stored in one FIFO table and once sixteen conversion values are stored, a new conversion value is stored by deleting the oldest data.

Subsequent Step 403a is a step in which a moving average value is calculated for each of the latest predetermined numbers of the digital conversion values stored in the respective shift registers SRG2 and SRG3 in Step 402 by dividing a sum of each shift register by the number of additions.

Subsequent Step 403b is a step in which a moving average value is calculated for each of the latest predetermined numbers of the digital conversion values stored in the respective shift registers SFT1, SFT2, and so on in Step 402 by dividing a sum of each shift register by the number of additions. This step corresponds to a calibration processing portion to remove a pulsation component from the digital conversion value for the second analog signal A2j.

Subsequent Step 404 is a determination step in which a determination is made as to whether it is abnormality determination timing or not. Herein, a determination of YES is made periodically in cycles, for example, of 100 msec. or shorter at the beginning of or during the operation, and advancement is then made to Step 405. When the abnormality determination is not to be made, a determination of NO is made and advancement is made to Step 409. Step 405 is a step in which a maximum deviation, which is a deviation between a maximum value and a minimum value, is calculated for any one of the latest predetermined numbers of the digital conversion values stored in the respective shift registers SRG0, SRG2, and SRG3 in Step 402. It is, however, preferable to perform probable statistical processing, by which actual maximum value and minimum value are discarded and a deviation between the second largest value and the second smallest value is found to be the maximum deviation.

Subsequent Step 406a is a determination step in which a determination is made as to whether the maximum deviation calculated in Step 405 is excessively large or not by comparison with a determination threshold value of the maximum deviation set in advance for any one of the digital conversion values of the smoothed power-supply monitor signal Ma1, the second power-supply monitor signal Mb2, and the third power-supply monitor signal Mb3. When the maximum deviation is excessively large, a determination of YES is made and advancement is made to Step 407a and when the maximum deviation is normal, a determination of NO is made and advancement is made to Step 406b.

In Step 407a, an abnormality is notified or at least abnormality occurrence information is written into a predetermined region of the RAM memory 123, after which advancement is made to Step 406b. Step 406b is a determination step in which a determination is made as to whether the moving average value calculated in Step 403a is excessively large or small by comparison with a target band value set in advance for any one of the digital conversion values of the second power-supply monitor signal Mb2 and the third power-supply monitor signal Mb3. When the moving average value is excessively large or small, a determination of YES is made and advancement is made to Step 407b. When the moving average value is normal, a determination of NO is made and advancement is made to Step 409. In Step 407b, an abnormality is notified or at least abnormality occurrence information is written into a predetermined region of the RAM memory 123, after which advancement is made to Step 409. Herein, a step block 408 made up of Step 405 through Step 407b corresponds to an abnormality determination portion.

Step 409 is a step corresponding to an abnormality determination subject update portion that sequentially updates the shift register number selected in Step 405 from SRG0 to SRG2, from SGR2 to SGR3, and from SRG3 to SRG0. In subsequent operation ending Step 410, the micro-processor 121 runs another control program and returns to operation starting Step 400 within a period, for example, of 10 msec. It should be noted that Step 409 is a step to make an abnormality determination by limiting the subject to one monitor signal voltage in the same computation cycle in order to shorten an advancement time from Step 400 through Step 410.

As is obvious from the description above, an electronic control device of the first embodiment is the electronic control device 100A including: the constant-voltage power supply 110 having one or more than one constant-voltage control circuit portions that distributes and feeds or divides and feeds the first output voltage Vad, the second output voltage Vcp, or the third output voltage Vif, each of which is fed to a different subject, by the input power-supply voltage Vb fed from the outside power supply 101; and the main control circuit portion 120A having the micro-processor 121, the program memory 122A, and the RAM memory 123 fed by the second output voltage Vcp, and the multi-channel A-to-D converter 124A fed by the first output voltage Vad, all of which cooperate to drive the electronic load group 107 under control in response to an operation condition of the switch sensor group 106 and the analog sensor group 108.

The multi-channel A-to-D converter 124A generates a digital output in proportion to a ratio (Vin/Vref) of the reference voltage Vref applied to the reference voltage terminal and an input signal voltage Vin and, when the ratio is 1, generates a maximum digital output, $Dout=2^n-1$, according to an n-bit resolution, where n is a predetermined number.

The first output voltage Vad having the highest degree of accuracy among the multiple output voltages is applied to the reference voltage terminal as the reference voltage Vref and the smoothed power-supply monitor signal Ma1 to be used as the power-supply monitor voltage is inputted as one of the input signal voltages Vin of the multi-channel A-to-D converter 124A. The smoothed power-supply monitor signal Ma1 is a smoothed voltage obtained from a divided voltage of the first output voltage Vad by suppressing a pulsation component via the first power-supply filter 119, and a dividing ratio of the divided voltage is set so that the smoothed voltage takes a value not greater than a lowest value of a pulsation of the reference voltage Vref.

The micro-processor 121 cooperates with the program memory 122A and periodically inputs a digital conversion value of the smoothed power-supply monitor signal Ma1 into the shift register SRG0 formed of the RAM memory 123 to calculate a maximum deviation, which is a deviation between a maximum value and a minimum value of the latest predetermined number of digital conversion values, and determines an abnormality in the constant-voltage power supply 110 in a case where the calculated maximum deviation exceeds a predetermined threshold value.

Also, the electronic control device 100A may be configured in such a manner that one or both of the second output voltage Vcp and the third output voltage Vif are generated, respectively, by second and third constant-voltage control circuit portions separated from the constant-voltage control circuit portion that generates the first output voltage Vad.

Herein, as one of the input signal voltages Vin of the multi-channel A-to-D converter 124A, at least one of the second power-supply monitor signal Mb2 and the third power-supply monitor signal Mb3 to be used as the power-supply monitor voltage is inputted.

The second power-supply monitor signal Mb2 takes a value of the second output voltage Vcp and a maximum value of the second output voltage Vcp takes a value not greater than a minimum value of the reference voltage Vref.

The third power-supply monitor signal Mb3 is a divided voltage of the third output voltage Vif that feeds the input interface circuit 125 and the output interface circuit 126 provided to the main control circuit portion 120A, and a dividing ratio of the divided voltage is set so that a maximum value of the divided voltage takes a value not greater than the minimum value of the reference voltage Vref.

The micro-processor 121 cooperates with the program memory 122A and periodically inputs the digital conversion value of one of the second power-supply monitor signal Mb2 and the third power-supply monitor signal Mb3, respectively, into the shift registers SRG2 and SRG3 formed of the RAM memory 123 to calculate an average value of the latest predetermined number of digital conversion values and a maximum deviation, which is a deviation between a maximum value and a minimum value of the latest predetermined number of digital conversion values, and determines an abnormality in the constant-voltage power supply 110 in a case where the calculated maximum deviation or both of the calculated maximum deviation and the calculated average value exceed respective predetermined threshold values or predetermined band values.

According to the second characteristics of the invention described above, of the multiple output voltages generated by the constant-voltage power supply 110, the first output voltage Vad having the highest degree of accuracy is inputted as the reference voltage Vref and at least one of the second output voltage Vcp and the third output voltage Vif is inputted as the power-supply monitor voltage, and the presence or absence of an abnormality in the constant-voltage power supply 110 is determined by calculating an average value or a maximum deviation of the pulsation of the digital conversion values of the power-supply monitor voltage.

Hence, there is a characteristic that when the first output voltage Vad is determined as being normal, by inputting the first output voltage Vad having a high degree of accuracy as the reference voltage Vref, it becomes possible to determine in a reliable manner the presence or absence of an abnormality or the presence or absence of a pulsation variation, which is a sign of the occurrence of an abnormality, in output voltages other than the first output voltage Vad.

The micro-processor 121 cooperates with the program memory 122A and periodically makes an abnormality determination alternately for the smoothed power-supply monitor signal Ma1 and at least one of the second power-supply monitor signal Mb2 and the third power-supply monitor signal Mb3, so that more than one abnormality determination is not made in a same control flow.

According to the third characteristics of the invention described above, the abnormality determination processing for the power-supply monitor signals of multiple types is performed in a time-dividing manner.

Hence, there is a characteristic that because more than one abnormality determination is not made in the same computation cycle, it becomes possible to make an abnormality determination for multiple output voltages one by one by lessening a burden of high speed control on the micro-processor 121.

The first output voltage Vad having the highest degree of accuracy among the multiple output voltages is applied to the reference voltage terminal as the reference voltage Vref and the smoothed power-supply monitor signal Ma1 to be used as the power-supply monitor voltage is inputted as one of the input signal voltages Vin of the multi-channel A-to-D converter 124A. The analog sensor group 108 includes the first analog sensor 104 that operates on the first output voltage Vad as a power supply, a detection signal voltage of which as a sensor varies in proportion to a value of the first output voltage Vad, and the second analog sensor 105 that operates on the input power-supply voltage Vb or the first output voltage Vad as a power supply, a detection signal voltage of which as a sensor is not influenced by a pulsation variation of the first output voltage Vad.

Input circuits of the first and second analog sensors 104 and 105 include the bypass capacitors 142 and 152, respectively, that suppress a foreign high-frequency noise in a band of several MHz to tens MHz, and noise filters 140 and 150 that suppress a noise component of tens Hz to several KHz or higher generated in the input circuits are connected to the respective input circuits.

Of the noise filters 140 and 150, at least the noise filter 140 connected to the first analog sensor 104 is a low-pass filter having a first break frequency, whereas the first power-supply filter 119 is a low-pass filter that smoothes a pulsation component of tens Hz to tens KHz or higher, which are pulsation frequencies when the first output voltage Vad is in an abnormal state, and has a second break frequency lower than the first break frequency.

According to the fourth characteristics of the invention described above, the noise filters 140 and 150 not only to suppress a foreign surge voltage but also to suppress a noise component generated in the input circuits are connected to the input circuits of the analog sensor group 108. In order to suppress a pulsation component of the first output voltage Vad, the noise filters 140 and 150 become effective in a frequency region higher than that of the power-supply filter.

Hence, there is a characteristic that while a pulsation frequency of the first output voltage Vad is low, the first analog signal A1k by the first analog sensor 104 varies in association with a variation of the first output voltage Vad even when a pulsation amplitude of the first output voltage Vad or the center value thereof itself varies, and high accurate digital conversion can be performed. In addition, when the first output voltage Vad changes to an abnormal state and a pulsation frequency becomes higher, because the first analog signal A1k is smoothed by the noise filters 140, the first analog signal A1k no longer varies in association with the first output voltage Vad and digital conversion accuracy is deteriorated. However, there is a characteristic that the occurrence of an abnormality can be detected in this case by the micro-processor 121 that monitors the smoothed power-supply monitor signal.

Likewise, in the case of the second analog signal A2j by the second analog sensor 105, there is a characteristic that while the first output voltage Vad is in a normal state, even when the second analog signal A2j contains a low-amplitude pulsation component allowed at low frequencies, the second analog signal A2j is converted into a digital form within an allowable error range. Also, the digital conversion accuracy of the second analog signal A2j deteriorates when the pulse amplitude increases. However, there is a characteristic that the occurrence of an abnormality can be detected by the micro-processor 121 in this case.

The micro-processor 121 cooperates with the program memory 122A and periodically inputs a digital conversion value of the second analog signal A2j, which is at least one of signals of the second analog sensor 105, into the shift register SFTj formed of the RAM memory 123 to calculate a moving average value, which is an average value of the latest predetermined number of digital conversion values, and specifies the calculated moving average value as a digital conversion value for the second analog signal A2j.

According to the fifth characteristics of the invention described above, when the second analog signal A2j by the second analog sensor 105, a detection signal voltage of which as a sensor is stable even when the value of the first output voltage Vad pulsates, is inputted as an input signal of the multi-channel A-to-D converter 124A operating on the first output voltage Vad by the constant-voltage power supply 110 used as the reference voltage Vref, the moving average value of the digital conversion values is specified as a digital conversion value for the second analog signal A2j.

Hence, there are characteristics that even when the digital conversion value is obtained by converting an input signal voltage not influenced by a variation of the first output voltage Vad into a digital form according to the reference voltage Vref including a pulsation component and this digital conversion value pulsates, an exact digital conversion value can be obtained easily by calculating the moving average value of the digital conversion values.

Also, in the case of the first analog sensor 104, a detection signal voltage of which as a sensor varies in proportion to a value of the first output voltage Vad, an exact digital conversion value can be obtained even when the reference voltage Vref of the multi-channel A-to-D converter 124A pulsates at a low frequency. Hence, there is a characteristic that it is more advantageous when the analog sensor group 108 includes a larger number of the first analog sensors 104.

Also, even with the second analog sensor 105, by applying calibration processing only to those having a small detection signal voltage and requiring a high-accurate digital conversion value, it becomes possible to prevent a control burden from being applied excessively to the micro-processor 121.

Second Embodiment

A configuration of an electronic control device according to a second embodiment of the invention, chiefly a difference from the first embodiment above, will now be described in detail using an overall configuration view of FIG. 5 and a partial detailed circuit diagram of FIG. 6. In the first embodiment above, the first output voltage Vad is applied intact to the reference voltage terminal of the multi-channel A-to-D converter 124A and the smoothed power-supply monitor signal Ma1 obtained by smoothing the first output voltage Vad by the first power-supply filter 119 is inputted as the input signal voltage Vin. In contrast to this configuration, a main difference of the second embodiment is that a voltage obtained by smoothing the first output voltage Vad by a reference power-supply filter 129 is applied to a reference voltage terminal of a multi-channel A-to-D converter 124B and an unsmoothed power-supply monitor signal Mb1 obtained by dividing the first output voltage Vad is inputted as the input signal voltage Vin. Same reference numerals denote same or equivalent portions in the respective drawings.

Figure 5:
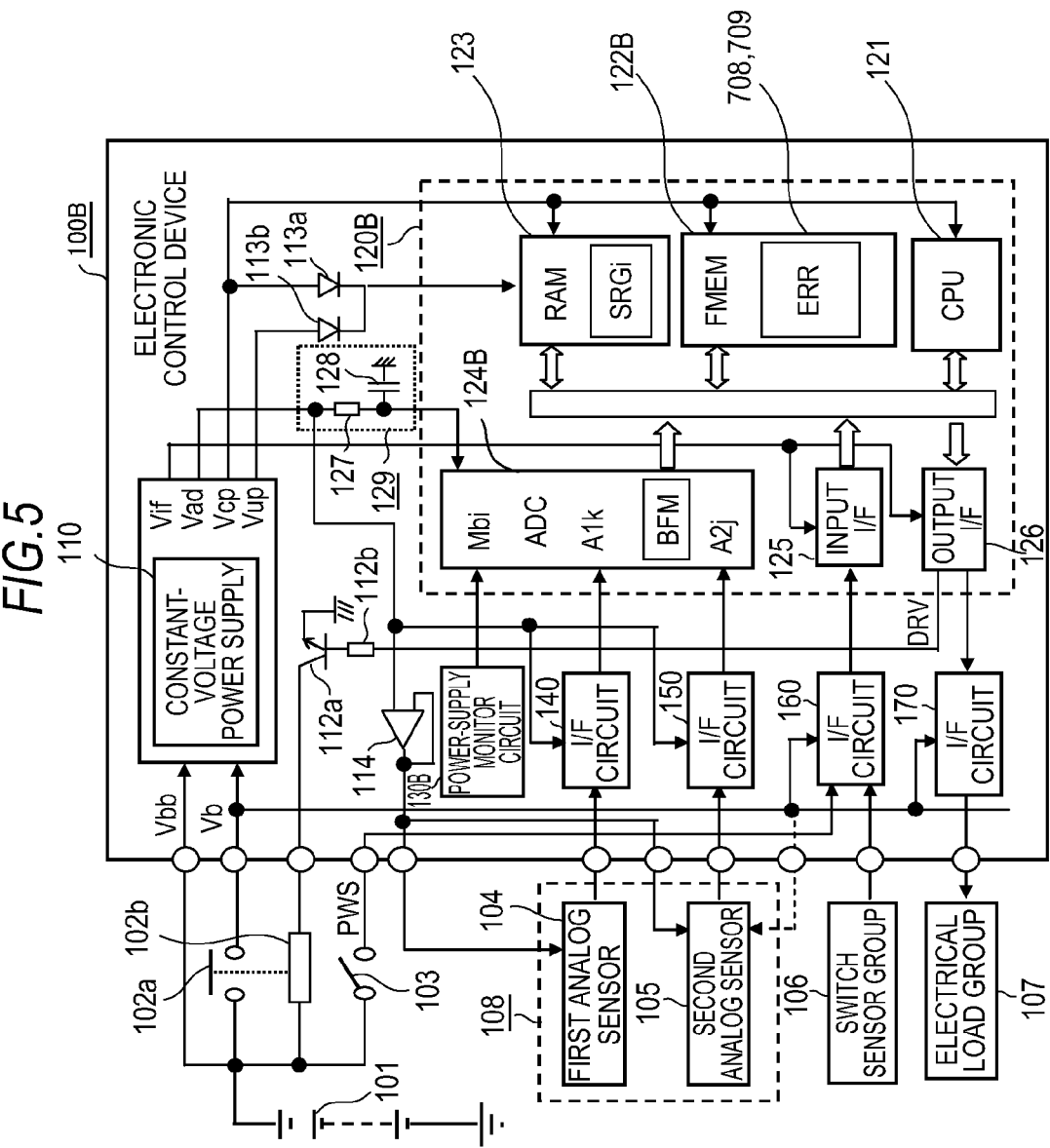
FIG. 5 is a view showing an overall configuration of an electronic control device according to a second embodiment of the invention.

Referring to FIG. 5, as in the first embodiment above, the outside power supply 101, the output contact 102a and the exciting coil 102b of the power-supply relay, the power-supply switch 103, the analog sensor group 108 formed of the first analog sensor 104 and the second analog sensor 105, the switch sensor group 106, and the electrical load group 107 are connected to an electronic control device 100B, to which an input power-supply voltage Vb and an auxiliary power-supply voltage Vbb are applied.

As in the first embodiment above, the constant-voltage power supply 110, the feeding diodes 113a and 113b, the buffer amplifier 114, a main control circuit portion 120B, a power-supply monitor circuit 130B described below with reference to FIG. 6, the noise filters 140 and 150, the preceding-stage input interface circuit 160, and the subsequent-stage output interface circuit 170 are provided in the electronic control device 100B.

The main control circuit portion 120B is formed of the micro-processor 121, a program memory 122B, the computation processing RAM memory 123, a multi-channel A-to-D converter 124B, the input interface circuit 125, and the output interface circuit 126. These components are interconnected by a data bus. It should be noted that power is fed to the reference voltage terminal of the multi-channel A-to-D converter 124B from the first output voltage Vad via a reference power-supply filter 129 formed of a smoothing resistor 127 and a smoothing capacitor 128.

The program memory 122B cooperates with the micro-processor 121 and is pre-installed with a control program run to realize an abnormality determination portion 708 and an abnormality determination subject update portion 709 described below with reference to FIG. 7. The RAM memory 123 contains shift registers SRGi described below and is fed from the second and fourth output voltages Vcp and Vup via the diodes 113a and 113b, respectively.

An unsmoothed power-supply monitor signal Mb1 and second and third power-supply monitor signals Mb2 and Mb3 are inputted into the multi-channel A-to-D converter 124B from a power-supply monitor circuit 130B described below with reference to FIG. 6. Also, a first analog signal A1k is inputted from the first analog sensor 104 via the noise filter 140 and a second analog signal A2j is inputted from the second analog sensor 105 via the noise filter 150.

As with the case of FIG. 1, the constant-voltage power supply 110 generating first through fourth output voltages feeds power from unillustrated multiple constant-voltage control portions provided in the constant-voltage power supply 110 by dividing the respective output voltages. The first output voltage Vad and the third output voltage Vif are same rated voltages at different degrees of output voltage accuracy. Hence, by setting the output voltage accuracy to a high degree, these output voltages can be distributed and fed from a single constant-voltage control circuit portion. Also, in a case where the micro-processor 121 is a low-capacity memory operating at a low speed, DC 5 V is used as the second output voltage Vcp. In this case, the first output voltage Vad, the second output voltage Vcp, and the third output voltage Vif can be distributed and fed from a single constant-voltage control circuit portion.

Figure 6:
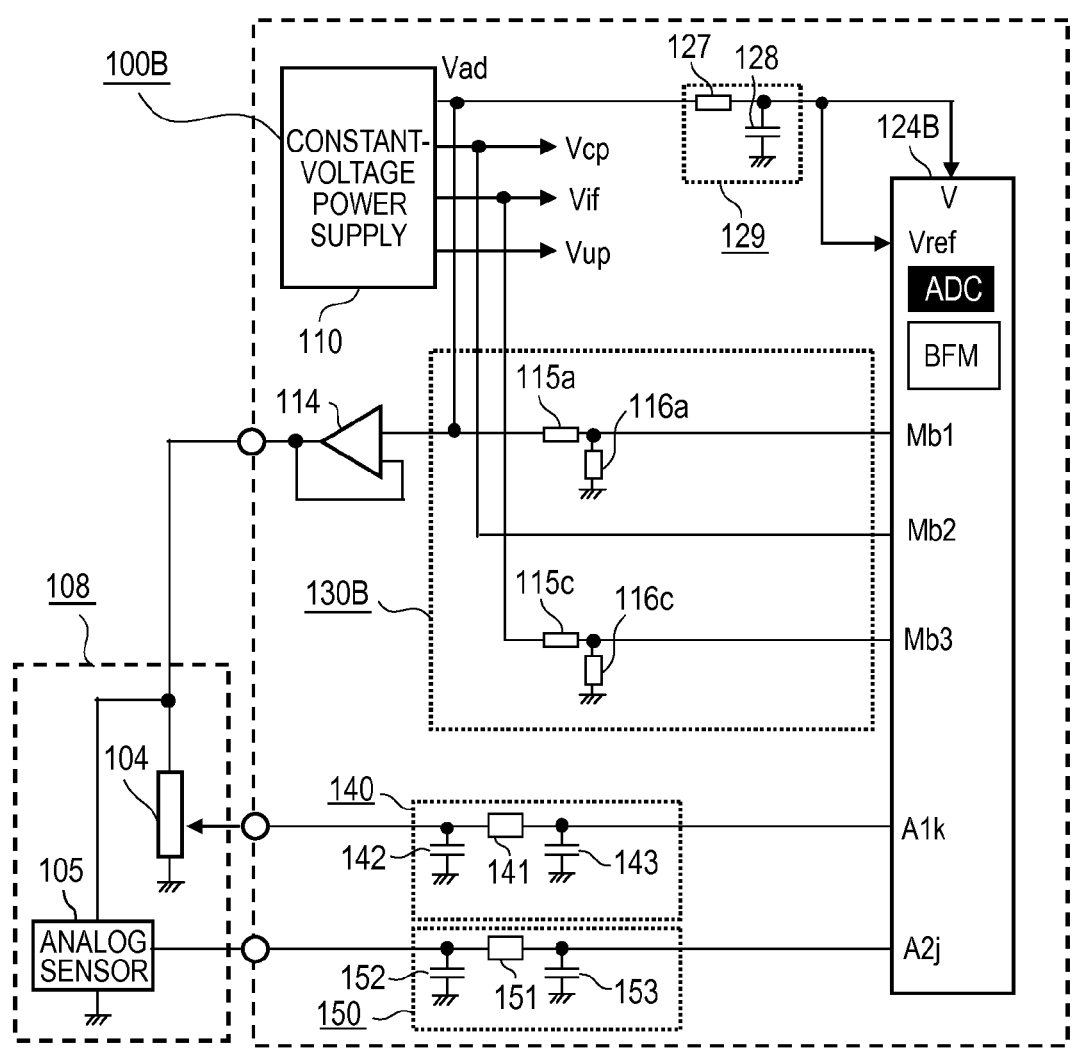
FIG. 6 is a partial detailed circuit diagram of the electronic control device according to the second embodiment of the invention.

Referring to FIG. 6, a voltage obtained by smoothing the first output voltage Vad by the reference power-supply filter 129 is applied to the multi-channel A-to-D converter 124B as the power-supply voltage Vcc and the reference voltage Vref.

Also, the unsmoothed power-supply monitor signal Mb1, and the second power-supply monitor signal Mb2 and the third power-supply monitor signal Mb3 described above with reference to FIG. 2, all of which are generated by the power-supply monitor circuit 130B, and the first analog signal A1k and the second analog signal A2j outputted from the noise filters 140 and 150, respectively, are connected to the multi-channel A-to-D converter 124B as input signals. Herein, the unsmoothed power-supply monitor signal Mb1 is a signal obtained by dividing the first output voltage Vad using the dividing resistors 115a and 116a.

The noise filters 140 and 150 provided to input circuits of the first and second analog sensors 104 and 105, respectively, include the bypass capacitors 142 and 152, respectively, which not only suppress a noise signal of tens Hz to several KHz or higher generated in the analog input circuits, but also suppress a foreign high-frequency noise in a band of several MHz to tens MHz. As has been described in the first embodiment above, a noise suppressing effect can be enhanced by increasing a smoothing time constant (that is, by lowering a break frequency) to the extent possible. However, on the other hand, responsivity as a sensor is deteriorated when the smoothing time constant is increased excessively (that is, when the break frequency is lowered excessively). Hence, a noise filter having a smoothing time constant increased (that is, the break frequency lowered) to the extent possible within an allowable range of the responsivity as a sensor is adopted for the noise filters 140 and 150 herein. Accordingly, at least in the case of the noise filters 140 for the first analog sensor 104, a low-pass filter having a first break frequency, for example, of 20 Hz is adopted and the same applies to the noise filter 150.

On the contrary, a filter constant of the reference power-supply filter 129 is to smooth a pulsation component of tens Hz to tens KHz or higher, which are pulsation frequencies when the first output voltage Vad is in an abnormal state, and the reference power-supply filter 129 is a low-pass filter having a break frequency as high as that of the noise filter 140. This is crucial to maintain a high degree of digital conversion accuracy by allowing the first analog signal A1k to pulsate in association with a pulsation of the reference voltage Vref smoothed by the reference power-supply filter 129 when a pulsation component is generated in the first output voltage Vad. Regarding filter constants of the same characteristics, a resistor and a capacitor forming the low-pass filter vary from one to another. It is therefore sufficient for these filters to establish a relation having an overlapped region such that a minimum value of the one having the larger smoothing time constant is equal to or less than the maximum value of the other having the smaller smoothing time constant.

Figure 7:
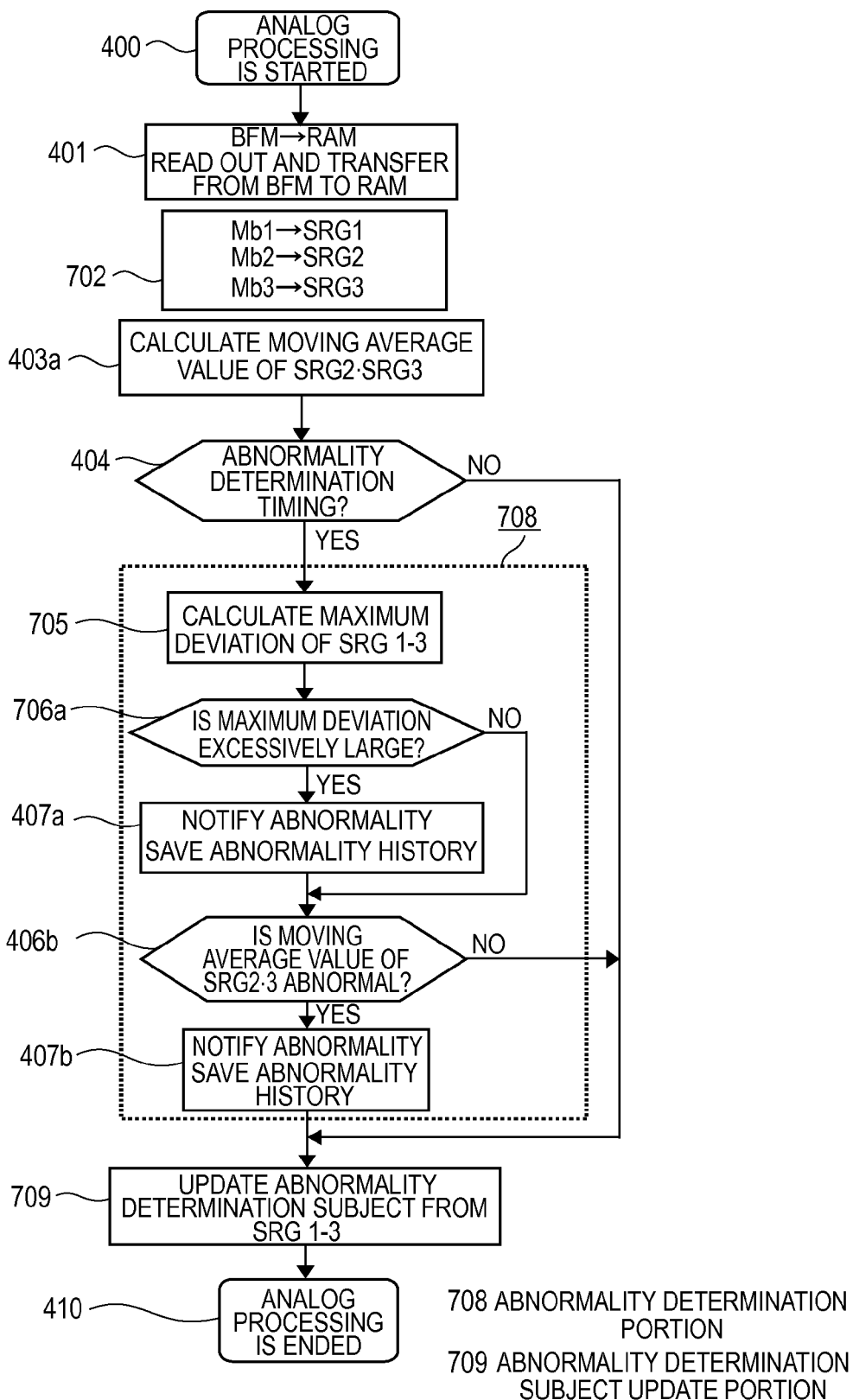
FIG. 7 is a flowchart depicting an operation of the electronic control device according to the second embodiment of the invention.

The electronic control device 100B of the second embodiment is configured as above and an operation and a function will now be described in detail according to the flowchart of FIG. 7 depicting the operation. In FIG. 7, steps denoted by 400s correspond to those denoted by 400s in FIG. 4 and descriptions will be given herein to steps denoted by 700s, which are different from those in FIG. 4.

Firstly, referring to FIG. 5 and FIG. 6, when the power-supply switch 103 is closed and the output contact 102a of the power-supply relay is closed, the constant-voltage power supply 110 having one or more than one constant-voltage control circuit portions distributes and feeds or divides and feeds the first output voltage Vad, the second output voltage Vcp, or the third output voltage Vif, each of which is fed to a different subject, by the input power-supply voltage Vb fed from the outside power supply 101.

The micro-processor 121 starts to operate when the second output voltage Vcp rises and drives the electrical load group 107 under control in response to an operation state of the switch sensor group 106 and the analog sensor group 108 in cooperation with the program memory 122B and the multi-channel A-to-D converter 124B. It should be noted that a voltage obtained by smoothing the first output voltage Vad by the reference power-supply filter 129 is applied to the power-supply terminal and the reference voltage terminal of the multi-channel A-to-D converter 124B.

Herein, the unsmoothed power-supply monitor signal Mb1 is a divided voltage of the first output voltage Vad. Because the reference voltage Vref of the multi-channel A-to-D converter 124B is obtained by smoothing the first output voltage Vad, when the first output voltage Vad is normal, the digital conversion value of the unsmoothed power-supply monitor signal Mb1 takes a constant value in proportion to a dividing ratio of the dividing resistors 115a and 116a. However, when the first output voltage Vad becomes abnormal and a pulsation component is generated, the pulsation of the reference voltage Vref is suppressed whereas the unsmoothed power-supply monitor signal Mb1 pulsates. Hence, the digital conversion value of the unsmoothed power-supply monitor signal Mb1 undergoes increased or decreased pulsation.

As will be described below with reference to FIG. 7, the micro-processor 121 determines the presence or absence of an abnormality in the first output voltage Vad by detecting this pulsation amplitude. It should be noted that a dividing ratio of the dividing resistors 115a and 116a is set so that a maximum value of the divided voltage by the unsmoothed power-supply monitor signal Mb1 takes a value not greater than the reference voltage Vref whose pulsation is suppressed.

The second and third power-supply monitor signals Mb2 and Mb3 are power-supply monitor inputs to determine the presence or absence of an abnormality in the low-accurate second and third output voltages Vcp and Vif, respectively, in reference to the reference voltage Vref obtained by smoothing the high-accurate first output voltage Vad operating normally by the reference power-supply filter 129. As will be described below with reference to FIG. 7, the micro-processor 121 determines the presence or absence of an abnormality in the second and third output voltages Vcp and Vif by monitoring average values and the pulsation amplitudes of the second and third power-supply monitor signals Mb2 and Mb3, respectively.

When the first output voltage Vad is pulsating or even when the average value varies, the first analog signal A1k itself varies in proportion to a variation of the first output voltage Vad, and moreover, the noise filter 140 having the characteristics same as those of the reference power-supply filter 129 is connected to the first analog signal A1k. Hence, the digital conversion value does not pulsate and can take a value in proportion to a dividing ratio by the first analog sensor 104, which is a potentiometer.

It should be noted, however, that in a case where a noise filter having a higher break frequency than the reference power-supply filter 129 is used for a part of the first analog signal A1k, the digital conversion value pulsates between this high brake frequency and the break frequency of the reference power-supply filter 129. An abnormality determination is made in this state by the unsmoothed power-supply monitor signal Mb1.

Contrary to this configuration, a signal voltage as a sensor can be obtained from the second analog signal A2j independently of a variation of the first output voltage Vad, and in a case where the average value of the first output voltage Vad falls within a predetermined accuracy range and a pulsation component is included, the reference voltage Vref of the multi-channel A-to-D converter 124B is smoothed by the reference power-supply filter 129. Hence, the calibration processing portion that calculates a moving average value of the digital conversion values as described in Step 403b of FIG. 4 is not necessary herein.

Referring to FIG. 7, Step 702 following Step 401 is a step in which the digital conversion values of the unsmoothed power-supply monitor signal Mb1, the second power-supply monitor signal Mb2, and the third power-supply monitor signal Mb3 are stored in first through third FIFO tables formed of the shift registers SRGi=SRG1, SRG2, and SRG3, respectively.

Subsequent Step 403a is a step in which a moving average value of the latest predetermined number of the digital conversion values stored in each of the shift registers SRG2 and SRG3 in Step 702 is calculated by dividing a sum of each shift register by the number of additions. Herein, subsequent Step 403b is omitted and advancement is made to Step 404.

Step 705 that functions when a determination of YES is made in Step 404 is a step in which a maximum deviation, which is a deviation between the maximum value and the minimum value, is calculated for any one of the latest predetermined number of the digital conversion values stored in the respective shift registers SRG1, SRG2, and SRG3 in Step 702. It is, however, preferable to perform probable statistical processing, by which actual maximum value and minimum value are discarded and a deviation between the second largest value and the second smallest value is found to be the maximum deviation.

Subsequent Step 706a is a determination step in which a determination is made as to whether the maximum deviation calculated in Step 705 is excessively large or not by comparison with a determination threshold value of the maximum deviation set in advance for any one of the digital conversion values of the unsmoothed power-supply monitor signal Mb1, the second power-supply monitor signal Mb2, and the third power-supply monitor signal Mb3. When the maximum deviation is excessively large, a determination of YES is made and advancement is made to Step 407a. When the maximum deviation is normal, a determination of NO is made and advancement is made to Step 406b. A step block 708 made up of Step 705 through Step 407b corresponds to an abnormality determination portion.

Step 709 that functions when a determination of NO is made in Step 404 or Step 406b or subsequent to Step 407b is a step corresponding to an abnormal determination subject update portion that sequentially updates the shift register number selected in Step 705 from SRG1 to SRG2, from SRG2 to SRG3, and from SRG3 to SRG1.

As is obvious from the description above, an electronic control device of the second embodiment is the electronic control device 100B including: the constant-voltage power supply 110 having one or more than one constant-voltage control circuit portions that distributes and feeds or divides and feeds the first output voltage Vad, the second output voltage Vcp, or the third output voltage Vif, each of which is fed to a different subject, by the input power-supply voltage Vb fed from the outside power supply 101; and the main control circuit portion 120B having the micro-processor 121, the program memory 122B, and the RAM memory 123 fed by the second output voltage Vcp, and the multi-channel A-to-D converter 124B fed by the first output voltage Vad, all of which cooperate to drive the electronic load group 107 under control in response to an operation condition of the switch sensor group 106 and the analog sensor group 108.

The multi-channel A-to-D converter 124B generates a digital output in proportion to a ratio (Vin/Vref) of the reference voltage Vref applied to the reference voltage terminal and the input signal voltage Vin and, when the ratio is 1, generates a maximum digital output, Dout=$2^n-1$, according to an n-bit resolution, where n is a predetermined number.

A voltage is applied to the reference voltage terminal from the first output voltage Vad having the highest degree of accuracy among the multiple output voltages as the reference voltage Vref by suppressing a pulsation component via the reference power-supply filter 129 and the unsmoothed power-supply monitor signal Mb1 to be used as the power-supply monitor voltage is inputted as one of the input signal voltages Vin of the multi-channel A-to-D converter 124B. The unsmoothed power-supply monitor signal Mb1 is a divided voltage of the first output voltage Vad and a dividing ratio of the divided voltage is set so that the divided voltage takes a value not greater than a lowest value of the pulsation of the reference voltage Vref.

The micro-processor 121 cooperates with the program memory 122B and periodically inputs a digital conversion value of the unsmoothed power-supply monitor signal Mb1 into the shift register SRG1 formed of the RAM memory 123 to calculate a maximum deviation, which is a deviation between a maximum value and a minimum value of the latest predetermined number of digital conversion values, and determines an abnormality in the constant-voltage power supply 110 in a case where the calculated maximum deviation exceeds a predetermined threshold value.

Also, the electronic control device 100B may be configured in such a manner that one or both of the second output voltage Vcp and the third output voltage Vif are generated, respectively, by second and third constant-voltage control circuit portions separated from the constant-voltage control circuit portion that generates the first output voltage Vad.

As one of the input signal voltages Vin of the multi-channel A-to-D converter 124B, at least one of the second power-supply monitor signal Mb2 and the third power-supply monitor signal Mb3 to be used as the power-supply monitor voltage is inputted.

The second power-supply monitor signal Mb2 takes a value of the second output voltage Vcp and a maximum value of the second output voltage Vcp takes a value not greater than a minimum value of the reference voltage Vref. The third power-supply monitor signal Mb3 is a divided voltage of the third output voltage Vif that feeds the input interface circuit 125 and the output interface circuit 126 provided to the main control circuit portion 120B, and a dividing ratio of the divided voltage is set so that a maximum value of the divided voltage takes a value not greater than the minimum value of the reference voltage Vref.

The micro-processor 121 cooperates with the program memory 122B and periodically inputs the digital conversion value of one of the second power-supply monitor signal Mb2 and the third power-supply monitor signal Mb3, respectively, into the shift registers SRG2 and SRG3 formed of the RAM memory 123 to calculate an average value of the latest predetermined number of digital conversion values and a maximum deviation, which is a deviation between a maximum value and a minimum value of the latest predetermined number of digital conversion values, and determines an abnormality in the constant-voltage power supply 110 in a case where the calculated maximum deviation or both of the calculated maximum deviation and the calculated average value exceed respective predetermined threshold values or predetermined band values.

According to the second characteristics of the invention described above, of the multiple output voltages generated by the constant-voltage power supply 110, a smoothed voltage of the first output voltage Vad having the highest degree of accuracy is inputted as the reference voltage Vref and at least one of the second output voltage Vcp and the third output voltage Vif is inputted as the power-supply monitor voltage, so that the presence or absence of an abnormality in the constant-voltage power supply 110 is determined by calculating an average value or a maximum deviation of the pulsation of the digital conversion values of the power-supply monitor voltage.

Hence, there is a characteristic that in a case where the first output voltage Vad is determined as being normal, by inputting the first output voltage Vad having a high degree of accuracy as the reference voltage Vref, it becomes possible to determine in a reliable manner the presence or absence of an abnormality or the presence or absence of a pulsation variation, which is a sign of the occurrence of an abnormality, in output voltages other than the first output voltage Vad.

The micro-processor 121 cooperates with the program memory 122B and periodically makes an abnormality determination alternately for the unsmoothed power-supply monitor signal Mb1 and at least one of the second power-supply monitor signal Mb2 and the third power-supply monitor signal Mb3, so that more than one abnormality determination is not made in a same control flow.

According to the third characteristics of the invention described above, the abnormality determination processing for the power-supply monitor signals of multiple types is performed in a time-dividing manner.

Hence, as in the first embodiment above, there is a characteristic that because more than one abnormality determination is not made in the same computation cycle, it becomes possible to make an abnormality determination for multiple output voltages one by one by lessening a burden of high speed control on the micro-processor 121.

A voltage is applied from the first output voltage Vad to the reference voltage terminal as the reference voltage Vref by suppressing a pulsation component via the reference power-supply filter 129, and the unsmoothed power-supply monitor signal Mb1 to be used as the power-supply monitor voltage is inputted as one of the input signal voltages Vin of the multi-channel A-to-D converter 124B.

The analog sensor group 108 includes the first analog sensor 104 that operates on the first output voltage Vad as a power supply, a detection signal voltage of which as a sensor varies in proportion to a value of the first output voltage Vad, and the second analog sensor 105 that operates on the input power-supply voltage Vb or the first output voltage Vad as a power supply, a detection signal voltage of which as a sensor is not influenced by a pulsation variation of the first output voltage Vad.

Input circuits of the first and second analog sensors 104 and 105 include the bypass capacitors 142 and 152, respectively, that suppress a foreign high-frequency noise in a band of several MHz to tens MHz, and the noise filters 140 and 150 that suppress a noise component of tens Hz to several KHz or higher generated in the input circuits are connected to the respective input circuits.

Of the noise filters 140 and 150, at least the noise filter 140 connected to the first analog sensor 104 is a low-pass filter having a first break frequency, whereas the reference power-supply filter 129 is a low-pass filter that smoothes a pulsation component of tens Hz to tens KHz or higher, which are pulsation frequencies when the first output voltage Vad is in an abnormal state, and has a break frequency as high as the first break frequency.

According to the sixth characteristics of the invention described above, the noise filters 140 and 150 not only to suppress a foreign surge voltage but also to suppress a noise component generated in the input circuits are connected to the input circuits of the analog sensor group 108. The noise filters 140 and 150 are filters having the characteristics same as those of the reference power-supply filter 129 used for the reference voltage Vref.

Hence, there is a characteristic that while the first output voltage Vad is in a normal state, the first analog signal A1$k$ by the first analog sensor 104 pulsates in association with a pulsation of the first output voltage Vad even when the first output voltage Vad pulsates at a low frequency and is further inputted into the multi-channel A-to-D converter 124B via the noise filters 140 having the characteristics same as those of the reference power-supply filter 129, and highly accurate digital conversion can be performed.

Likewise, in the case of the second analog signal A2$j$ by the second analog sensor 105, there is a characteristic that while the first output voltage Vad is in a normal state, even when the second analog signal A2$j$ contains a low-amplitude pulsation component allowed at low frequencies, the second analog signal A2$j$ is converted into a digital form within an allowable error range. Also, there is a characteristic that even when the pulsation frequency becomes higher, because the reference voltage Vref is smoothed, the digital conversion accuracy of the second analog signal A2$j$ is not deteriorated unless the average value of the first output voltage Vad varies.

Third Embodiment

A configuration of an electronic control device according to a third embodiment of the invention, chiefly a difference from the first embodiment or the second embodiment above, will now be described in detail using an overall configuration view of FIG. 8 and a partial detailed circuit diagram of FIG. 9. In the first embodiment above, the first output voltage Vad is applied intact to the reference voltage terminal of the multi-channel A-to-D converter 124A and the smoothed power-supplied monitor signal Ma1 obtained by smoothing the first output voltage Vad by the first power-supply filter 119 is inputted as the input signal voltage Vin. Also, in the second embodiment above, a voltage obtained by smoothing the first output voltage Vad by the reference power-supply filter 129 is applied to the reference voltage terminal of the multi-channel A-to-D converter 124B and the unsmoothed power-supply monitor signal Mb1 obtained by dividing the first output voltage Vad is inputted as the input signal voltage Vin.

Contrary to these configurations, a difference of the third embodiment is that a multi-channel A-to-D converter 124C is formed of a pair of a multi-channel A-to-D converter 124A and a multi-channel A-to-D converter 124B, which is a combination of the first embodiment and the second embodiment above. Herein, same reference numerals denote same or equivalent portions in the respective drawings.

Figure 8:
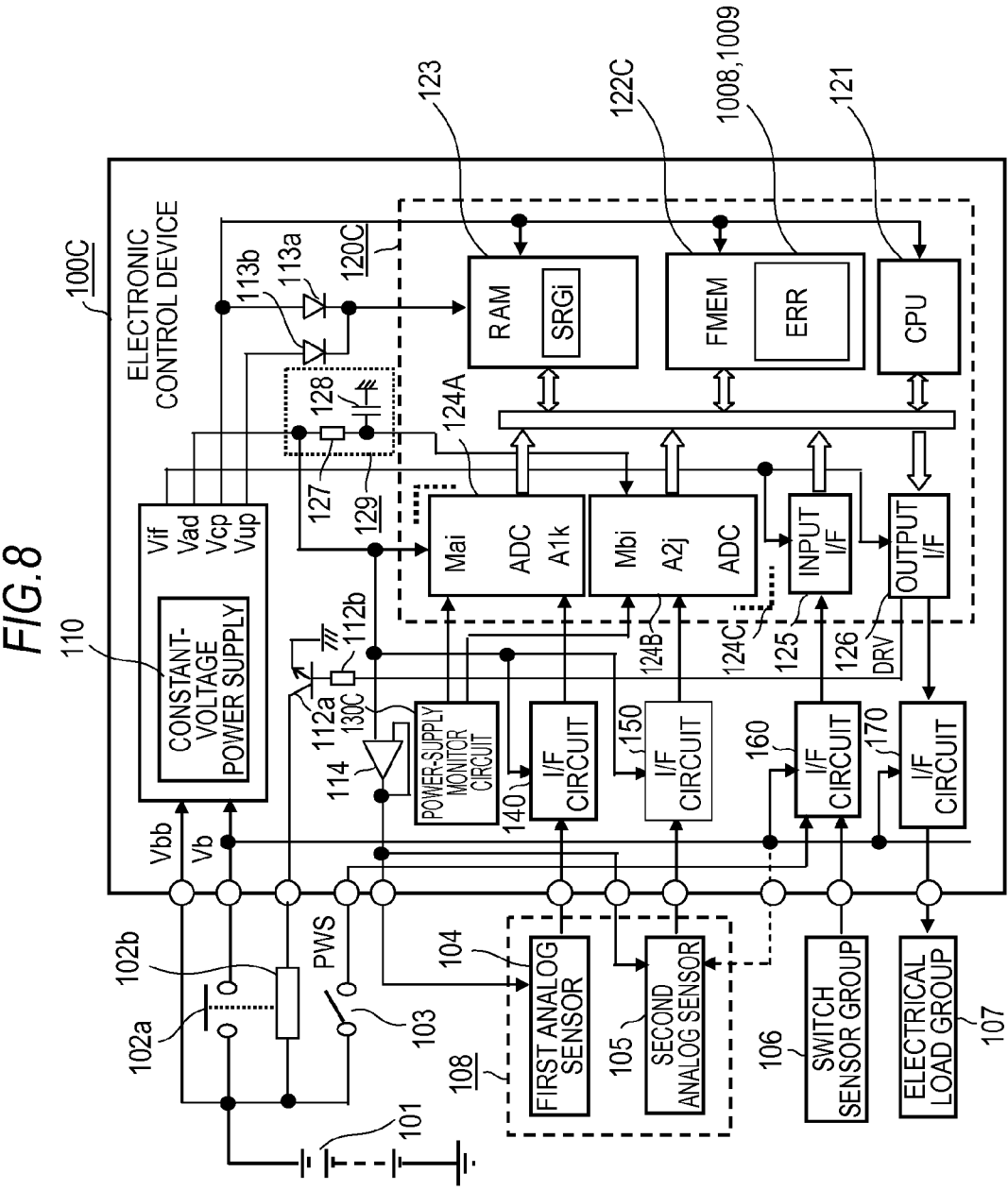
FIG. 8 is a view showing an overall configuration of an electronic control device according to a third embodiment of the invention.

Referring to FIG. 8, as in the first embodiment or the second embodiment above, the outside power supply 101, the output contact 102a and the exciting coil 102b of the power-supply relay, the power-supply switch 103, the analog sensor group 108 formed of the first analog sensor 104 and the second analog sensor 105, the switch sensor group 106, and the electrical load group 107 are connected to an electronic control device 100C, to which an input power-supply voltage Vb and an auxiliary power-supply voltage Vbb are applied.

As in the first embodiment or the second embodiment above, the constant-voltage power supply 110, the feeding diodes 113a and 113b, the buffer amplifier 114, a main control circuit portion 120C, a power-supply monitor circuit 130C described below with reference to FIG. 9, the noise filters 140 and 150, the preceding-stage input interface circuit 160, and the subsequent-stage output interface circuit 170 are provided in the electronic control device 100C.

The main control circuit portion 120C is formed of the micro-processor 121, a program memory 122C, the computation processing RAM 123, a multi-channel A-to-D converter 124C, the input interface circuit 125, and the output interface circuit 126. These components are interconnected by a data bus. It should be noted that the first output voltage Vad is applied intact to the reference voltage terminal of one multi-channel A-to-D converter 124A forming the multi-channel A-to-D converter 124C as the reference voltage Vref, whereas the reference voltage terminal of the other multi-channel A-to-D converter 124B is fed from the first output voltage Vad via the reference power-supply filter 129 formed of the smoothing resistor 127 and the smoothing capacitor 128.

The program memory 122C cooperates with the micro-processor 121 and is pre-installed with a control program run to realize an abnormality determination portion 1008 and an abnormality determination subject update portion 1009 described below with reference to FIG. 10. The RAM memory 123 contains shift registers SRGi described below and is fed from the second and fourth output voltages Vcp and Vup via the diodes 113a and 113b, respectively. As in the first embodiment or the second embodiment above, the constant-voltage power supply 110 generating first through fourth output voltages feeds power from unillustrated multiple constant-voltage control circuit portions provided in the constant-voltage power supply 110 by dividing the respective output voltages. The first output voltage Vad and the third output voltage Vif are same rated voltages at different degrees of output voltage accuracy. Hence, by setting the output voltage accuracy to a high degree, these output voltages can be distributed and fed from a single constant-voltage control circuit portion.

Also, in a case where the micro-processor 121 is a low-capacity memory operating at a low speed, DC 5 V is used as the second output voltage Vcp. In this case, the first output voltage Vad, the second output voltage Vcp, and the third output voltage Vif can be distributed and fed from a single constant-voltage control circuit portion.

Figure 9:
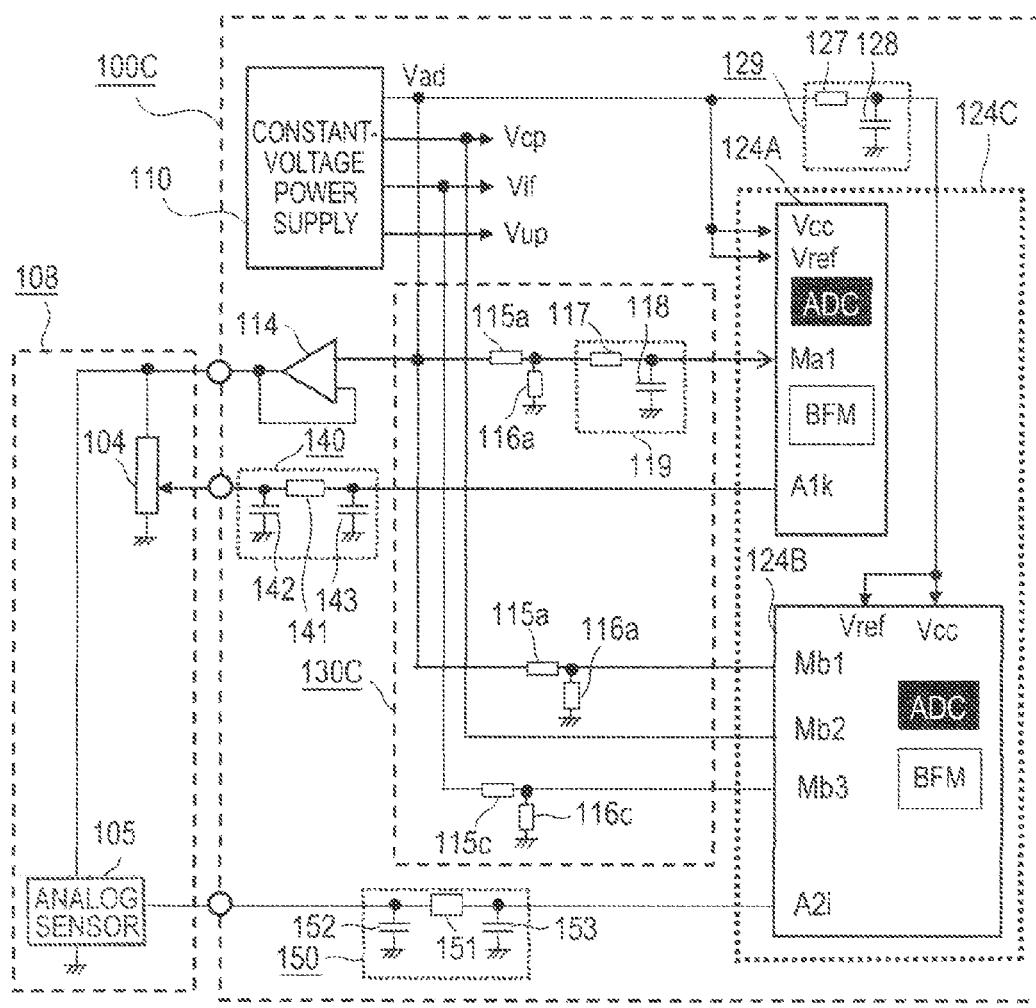
FIG. 9 is a partial detailed circuit diagram of the electronic control device according to the third embodiment of the invention.

Referring to FIG. 9, the smoothed power-supply monitor signal Ma1 described above with reference to FIG. 2 is inputted into the multi-channel A-to-D converter 124A from the power-supply monitor circuit 130C, and the first analog signal A1$k$ inputted via the noise filter 140 is inputted therein from the first analog sensor 104.

The unsmoothed power-supply monitor signal Mb1, the second power-supply monitor signal Mb2, and the third power-supply monitor signal Mb3 described above with reference to FIG. 6 are inputted to the multi-channel A-to-D converter 124B from the power-supply monitor circuit 130C, and the second analog signal A2$j$ inputted via the noise filter 150 is inputted therein from the second analog sensor 105.

The noise filters 140 and 150 provided to input circuits of the first and second analog sensors 104 and 105, respectively, include the bypass capacitors 142 and 152, respectively, which not only suppress a noise signal of tens Hz to several KHz or higher generated in the analog input circuits, but also suppress a foreign high-frequency noise in a band of several MHz to tens MHz as has been described above with reference to FIG. 2. At least in the case of the noise filter 140 for the first analog sensor 104, a low-pass filter having a first break frequency, for example, of 20 Hz is adopted and the same applies to the noise filter 150 for the second analog sensor 105.

A filter constant of the first power-supply filter 119 is to smooth a pulsation component of tens Hz to tens KHz or higher, which are pulsation frequencies when the first output voltage Vad is in an abnormal state, and the first power-supply filter 119 is a low-pass filter having a second break frequency, for example, of 10 Hz.

On the contrary, a filter constant of the reference power-supply filter 129 is to smooth a pulsation component of tens Hz to tens KHz or higher, which are pulsation frequencies when the first output voltage Vad is in an abnormal state, as with the case of FIG. 6, and the reference power-supply filter 129 is a low-pass filter having a break frequency as high as that of the noise filter 150.

This is crucial to maintain a high degree of digital conversion accuracy by allowing the second analog signal A2$j$ to pulsate in association with a pulsation of the reference voltage Vref smoothed by the reference power-supply filter 129 when a pulsation component is generated in the first output voltage Vad. Regarding filter constants of the same characteristics, the characteristics of a resistor and a capacitor forming the low-pass filter vary from one to another. It is therefore sufficient for these filters to establish a relation having an overlapped region such that a minimum value of the one having the larger smoothing time constant is equal to or less than the maximum value of the other having the smaller smoothing time constant.

The electronic control device 100C of the third embodiment is configured as described above and an operation and a function will now be described in detail according to the flowchart of FIG. 10 depicting the operation. In FIG. 10, steps denoted by 400$s$ correspond to those denoted by 400$s$ in FIG. 4 and descriptions will be given herein to steps denoted by 1000$s$, which are different from those in FIG. 4.

Firstly, referring to FIG. 8 and FIG. 9, when the power-supply switch 103 is closed and the output contact 102$a$ of the power-supply relay is closed, the constant-voltage power supply 110 having one or more than one constant-voltage control circuit portions distributes and feeds or divides and feeds the first output voltage Vad, the second output voltage Vcp, or the third output voltage Vif, each of which is fed to a different subject, by the input power-supply voltage Vb fed from the outside power supply 101.

The micro-processor 121 starts to operate when the second output voltage Vcp rises and drives the electrical load group 107 under control in response to an operation state of the switch sensor group 106 and the analog sensor group 108 in cooperation with the program memory 122C and the multi-channel A-to-D converter 124C.

The first output voltage Vad is applied to the reference voltage terminal of one multi-channel A-to-D converter 124A forming the multi-channel A-to-D converter 124C and the smoothed power-supply monitor signal Ma1 is applied as a power-supply monitor signal.

An output voltage of the reference power-supply filter 129 is applied to the reference voltage terminal of the other multi-channel A-to-D converter 124B, and the unsmoothed power-supply monitor signal Mb1 is applied as the power-supply monitor signal. Hence, both of the digital conversion values of the smoothed power-supply monitor signal Ma1 and the unsmoothed power-supply monitor signal Mb1 are used as a monitor signal for a double system used to extract a pulsation component of the first output voltage Vad.

Herein, either the smoothed power-supply monitor signal Ma1 or the unsmoothed power-supply monitor signal Mb1 can be omitted.

Alternatively, the second and third power-supply monitor signals Mb2 and Mb3 inputted into the multi-channel A-to-D converter 124B may be inputted into the multi-channel A-to-D converter 124A.

In a case where the second and third power-supply monitor signals Mb2 and Mb3 are connected to the multi-channel A-to-D converter 124B as is shown in FIG. 9, there can be achieved an advantage as in the case of FIG. 6 that a detection of the pulsation amplitudes of the second and third power-supply monitor signals Mb2 and Mb3 is not influenced by a pulsation variation of the first output voltage Vad.

In a case where the second and third power-supply monitor signals Mb2 and Mb3 are inputted into the multi-channel A-to-D converter 124A, there is a characteristic as in the case of FIG. 2 that a pulsation variation of the first output voltage Vad is added when the pulsation amplitudes of the second and third power-supply monitor signals Mb2 and Mb3 are detected, so that a combined abnormality determination is made independently of on which part an abnormality is present.

Herein, the first analog signal A1$k$ is inputted into the multi-channel A-to-D converter 124A as a measure, in the case of the first analog sensor 104, to effectively utilize the characteristics that the digital conversion accuracy thereof is not influenced by a variation of the average value or the pulsation amplitude of the first output voltage Vad. It should be noted, however, that when the pulsation frequency of the first output voltage Vad increases and pulsation suppression by the noise filter 140 starts, the first analog signal A1$k$ no longer pulsates in association with the reference voltage Vref. Hence, the digital conversion accuracy is deteriorated. An abnormality determination in this state is made by monitoring the smoothed power-supply monitor signal Ma1 at the end of the multi-channel A-to-D converter 124A or by monitoring the unsmoothed power-supply monitor signal Mb1 at the end of the multi-channel A-to-D converter 124B.

Also, the second analog signal A2$j$ is inputted into the multi-channel A-to-D converter 124B as a measure, in the case of the second analog sensor 105, to effectively utilize the characteristics thereof that a detection output itself of the sensor does not vary even when an average value or a pulsation amplitude of the first output voltage Vad varies and hence accurate digital conversion can be performed by smoothing the pulsation component as long as an average value of the reference voltage Vref of the multi-channel A-to-D converter 124B maintains a predetermined degree of accuracy.

It should be noted, however, that because the digital conversion accuracy is deteriorated when the pulsation average value of the first output voltage Vad varies, an abnormality determination in this state is made depending on magnitude of the pulsation component by monitoring the smoothed power-supply monitor signal Ma1 at the end of the multi-channel A-to-D converter 124A or by monitoring the unsmoothed power-supply monitor signal Mb1 at the end of the multi-channel A-to-D converter 124B.

Referring to FIG. 10, Step 1002 following Step 401 is a step in which the digital conversion values of the smoothed power-supply monitor signal Ma1, the unsmoothed power-supply monitor signal Mb1, the second power-supply monitor signal Mb2, and the third power-supply monitor signal Mb3 are stored in first through fourth FIFO tables formed of the shift registers SRG$i$=SRG0, SRG1, SRG2, and SRG3, respectively. Subsequent Step 403a is a step in which the moving average value is calculated for the latest predetermined number of digital conversion values stored in each of the shift registers SRG2 and SRG3 stored in Step 1002 by dividing a sum of each shift register by the number of additions. Herein, subsequent Step 403b is omitted and advancement is made to Step 404.

Step 1005 that functions when a determination of YES is made in Step 404 is a step in which a maximum deviation, which is a deviation between a maximum value and a minimum value, is calculated for any one of the latest predetermined number of digital conversion values stored in the respective shift registers SRG0, SRG1, SRG2, and SRG3 in Step 1002. It is, however, preferable to perform probable statistical processing, by which actual maximum value and minimum value are discarded and a deviation between the second largest value and the second smallest value is found to be the maximum deviation.

Subsequent Step 1006a is a determination step in which a determination is made as to whether the maximum deviation calculated in Step 1005 is excessively large or not by comparison with a determination threshold of the maximum deviation set in advance for any one of the digital conversion values of the smoothed power-supply monitor signal Ma1, the unsmoothed power-supply monitor signal Mb1, the second power-supply monitor signal Mb2, and the third power-supply monitor signal Mb3. When the maximum deviation is excessively large, a determination of YES is made and advancement is made to Step 407a. When the maximum deviation is normal, a determination of NO is made and advancement is made to Step 406b. Herein, a step block 1008 made up of Step 1005 through Step 407b corresponds to an abnormality determination portion.

Step 1009 that functions when a determination of NO is made in Step 404 or Step 406b or subsequent to Step 407b is a step that corresponds to an abnormality determination subject update portion that sequentially updates the shift register number selected in Step 1005 from SRG0 to SRG1, from SRG1 to SRG2, from SRG2 to SRG3, and from SRG3 to SRG0.

The above description is silent about a correction of a digital conversion error accompanying a variation of the average value of the first output voltage Vad for the second analog sensor 105. However, the first output voltage Vad is calibrated to be a predetermined output voltage at a reference environmental temperature in an inspection stage when the product is shipped. Further, it is preferable to store and save standard data of average correlation characteristics of a nearby temperature of the constant-voltage power supply 110 with respect to the first output voltage Vad empirically measured in advance using a large number of product samples in a non-volatile data memory, which is a partial region of the program memory. It is preferable that the constant-voltage power supply 110 is provided with an unillustrated temperature sensor, so that the micro-processor 121 estimates a value of the first output voltage Vad at a current temperature by monitoring a nearby temperature of the constant-voltage power supply 110 while the electronic control device 100C is in operation. Then, the micro-processor 121 calculates, correction coefficient K=(estimated voltage/calibrated first output voltage), and obtains a digital conversion value calibrated by D2j/K obtained by dividing the digital conversion value D2j of the second analog signal A2j by the correction coefficient K.

It is difficult to determine whether a value of the first output voltage Vad is within the target allowable error unless there is another reference voltage that can be believed to have a higher degree of accuracy. However, in the event of any abnormality in a feedback control system that performs constant-voltage control, an abnormality determination can be made by monitoring the smoothed power-supply monitor signal or the unsmoothed power-supply monitor signal Mb1 described above.

In the event of an abnormal state in which the value of the first output voltage Vad significantly deviates from the target allowable error, the average values of the digital conversion values of the second and third power-supply monitor signals Mb2 and M3 take an abnormal value. It is therefore possible to estimate which one of the first output voltage Vad, the second output voltage Vcp, and the third output voltage Vif is abnormal according to the majority logic.

As is obvious from the description above, an electronic control device of the third embodiment is the electronic control device 100C including: the constant-voltage power supply 110 having one or more than one constant-voltage control circuit portions that distributes and feeds or divides and feeds the first output voltage Vad, the second output voltage Vcp, or the third output voltage Vif, each of which is fed to a different subject, by the input power-supply voltage Vb fed from the outside power supply 101; and the main control circuit portion 120C having the micro-processor 121, the program memory 122C, and the RAM memory 123 fed by the second output voltage Vcp, and the multi-channel A-to-D converter 124C fed by the first output voltage Vad, all of which cooperate to drive the electronic load group 107 under control in response to an operation condition of the switch sensor group 106 and the analog sensor group 108.

The multi-channel A-to-D converter 124C generates a digital output in proportion to a ratio (Vin/Vref) of the reference voltage Vref applied to the reference voltage terminal and the input signal voltage Vin and, when the ratio is 1, generates a maximum digital output, $Dout=2^n-1$, according to an n-bit resolution, where n is a predetermined number.

The first output voltage Vad having the highest degree of accuracy among the multiple output voltages is applied to the reference voltage terminal as the reference voltage Vref and the smoothed power-supply monitor signal Ma1 used as the power-supply monitor voltage is inputted as one of input signal voltages Vin of the multi-channel A-to-D converter 124C, or a voltage is applied to the reference voltage terminal from the first output voltage Vad as the reference voltage Vref by suppressing a pulsation component via the reference power-supply filter 129 and the unsmoothed power-supply monitor signal Mb1 to be used as the power-supply monitor voltage is inputted as one of the input signal voltages Vin of the multi-channel A-to-D converter 124C.

The smoothed power-supply monitor signal Ma1 is a smoothed voltage obtained from a divided voltage of the first output voltage Vad by suppressing a pulsation component via the first power-supply filter 119, and a dividing ratio of the divided voltage is set so that the smoothed voltage takes a value not greater than a lowest value of a pulsation of the reference voltage Vref. The unsmoothed power-supply monitor signal Mb1 is a divided voltage of the first output voltage Vad and a dividing ratio of the divided voltage is set so that the divided voltage takes a value not greater than the lowest value of the pulsation of the reference voltage Vref.

The micro-processor 121 cooperates with the program memory 122C and periodically inputs a digital conversion value of one of the smoothed power-supply monitor signal Ma1 and the unsmoothed power-supply monitor signal Mb1, respectively, into the shift registers SRG0 and SRG1 formed of the RAM memory 123 to calculate a maximum deviation, which is a deviation between a maximum value and a minimum value of the latest predetermined number of digital conversion values, and determines an abnormality in the constant-voltage power supply 110 in a case where the calculated maximum deviation exceeds a predetermined threshold value.

The electronic control device 100C may be configured in such a manner that one or both of the second output voltage Vcp and the third output voltage Vif are generated, respectively, by second and third constant-voltage control circuit portions separated from the constant-voltage control circuit portion that generates the first output voltage Vad.

Herein, as one of the input signal voltages Vin of the multi-channel A-to-D converter 124C, at least one of the second power-supply monitor signal Mb2 and the third power-supply monitor signal Mb3 to be used as the power-supply monitor voltage is inputted.

The second power-supply monitor signal Mb2 takes a value of the second output voltage Vcp and a maximum value of the second output voltage Vcp takes a value not greater than a minimum value of the reference voltage Vref.

The third power-supply monitor signal Mb3 is a divided voltage of the third output voltage Vif that feeds the input interface circuit 125 and the output interface circuit 126 provided to the main control circuit portion 120C, and a dividing ratio of the divided voltage is set so that a maximum value of the divided voltage takes a value not greater than the minimum value of the reference voltage Vref.

The micro-processor 121 cooperates with the program memory 122C and periodically inputs the digital conversion value of one of the second power-supply monitor signal Mb2 and the third power-supply monitor signal Mb3, respectively, into the shift registers SRG2 and SRG3 formed of the RAM memory 123 to calculate an average value of the latest predetermined number of digital conversion values and a maximum deviation, which is a deviation between a maximum value and a minimum value of the latest predetermined number of digital conversion values, and determines an abnormality in the constant-voltage power supply 110 in a case where the calculated maximum deviation or both of the calculated maximum deviation and the calculated average value exceed respective predetermined threshold values or predetermined band values.

According to the second characteristics of the invention described above, of the multiple output voltages generated by the constant-voltage power supply 110, the first output voltage Vad having the highest degree of accuracy or a smoothed voltage thereof is inputted as the reference voltage Vref and at least one of the second output voltage Vcp and the third output voltage Vif is inputted as the power-supply monitor voltage, so that the presence or absence of an abnormality in the constant-voltage power supply 110 is determined by calculating an average value or a maximum deviation of the pulsation of the digital conversion values of the power-supply monitor voltage.

Hence, there is a characteristic that when the first output voltage Vad is determined as being normal, by inputting the first output voltage Vad having a high degree of accuracy as the reference voltage Vref, it becomes possible to determine in a reliable manner the presence or absence of an abnormality or the presence or absence of a pulsation variation, which is a sign of the occurrence of an abnormality, in output voltages other than the first output voltage Vad.

The micro-processor 121 cooperates with the program memory 122C and periodically makes an abnormality determination alternately for at least one of the smoothed power-supply monitor signal Ma1 and the unsmoothed power-supply monitor signal Mb1 and at least one of the second power-supply monitor signal Mb2 and the third power-supply monitor signal Mb3, so that more than one abnormality determination is not made in a same control flow.

According to the third characteristics of the invention described above, the abnormality determination processing for the power-supply monitor signals of multiple types is performed in a time-dividing manner.

Hence, there is a characteristic that because more than one abnormality determination is not made in the same computation cycle, it becomes possible to make an abnormality determination for multiple output voltages one by one by lessening a burden of high speed control on the micro-processor 121.

The multi-channel A-to-D converter 124C is divided to multiple multi-channel A-to-D converters 124A and 124B. The first output voltage Vad is applied to the reference terminal of one multi-channel A-to-D converter 124A as the reference voltage Vref, and a voltage is applied from the first output voltage Vad to the reference terminal of the other multi-channel A-to-D converter 124B as the reference voltage Vref by suppressing a pulsation component via the reference power-supply filter 129. An input signal obtained from the first analog sensor 104 is inputted into an analog input terminal of the multi-channel A-to-D converter 124A with a priority as a first analog signal A1k, and an input signal obtained from the second analog sensor 105 is inputted into an analog input terminal of the other multi-channel A-to-D converter 124B with a priority as a second input signal A2j.

According to the seventh characteristics of the invention described above, the first analog signal from the first analog sensor 104, a detection signal voltage of which varies in proportion to a value of the first output voltage Vad, is inputted into the multi-channel A-to-D converter 124A operating on a stabilized control voltage by the constant-voltage power supply 110 used as the reference voltage Vref, and the second analog signal from the second analog sensor 105, a detection signal voltage of which remains stable even when a value of the first output voltage Vad varies, is inputted into the other multi-channel A-to-D converter 124B operating on a voltage obtained from the first output voltage Vad by the constant-voltage power supply 110 by smoothing a pulsation component and used as the reference voltage Vref.

Hence, there is a characteristic that even in a case where the first output voltage Vad is in a normal state and has a low-frequency pulsation, both of the first and second analog sensors 104 and 105 can perform accurate digital conversion. In a case where there are more than or less than necessary first and second analog sensors 104 and 105 and there are more than or less than necessary inputs and outputs for either the multi-channel A-to-D converter 124A or 124B, either one of the first and second analog sensors 104 and 105, whichever has the larger detection signal voltage and does not require a high-accurate digital conversion value, can input signals into either one of the multi-channel A-to-D converters 124A and 124B. Hence, it can be suppressed that the inputs to the multi-channel A-to-D converts 124A and 124B as a whole are excessive, which is an uneconomical operation.

While the first through third embodiments of the invention have been described, it is understood that the respective embodiments can be combined without any restriction and the respective embodiments can be modified or omitted as the need arises within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. An electronic control device, comprising:
    a constant-voltage power supply including a constant-voltage control circuit portion; and
    a main control circuit portion including
    a multi-channel A-to-D converter,
    a micro-processor,
    a program memory, and
    a RAM memory cooperate to drive an electronic load group under control in response to an operation condition of a switch sensor group and an analog sensor group,
    wherein:
    the constant-voltage power supply is fed an input power-supply voltage from a power supply outside the electronic control device, and
    the constant-voltage control circuit portion operates to distribute and feed or
    divide and feed
    a first output voltage to the multi-channel A-to-D converter, and the first output voltage having a highest degree of accuracy among the first and second output voltages, or
    a second output voltage to the RAM memory, and
    wherein:
    the multi-channel A-to-D converter generates a digital output in proportion to a ratio of a reference voltage applied to a reference voltage terminal and an input signal voltage and, when the ratio is 1, the multi-channel A-to-D converter generates a maximum digital output, $2^n - 1$, according to an n-bit resolution, where n is a predetermined number;
        the reference voltage terminal is fed in one of the following manners in which,
        the first output voltage is applied to the reference voltage terminal as the reference voltage and a smoothed power-supply monitor signal to be used as a power-supply monitor voltage is inputted as one of input signal voltages of the multi-channel A-to-D converter, and
        a voltage is applied to the reference voltage terminal from the first output voltage as the reference voltage by suppressing a pulsation component via a reference power-supply filter and an unsmoothed power-supply monitor signal to be used as the power-supply monitor voltage is inputted as one of the input signal voltages of the multi-channel A-to-D converter;
        the smoothed power-supply monitor signal being a smoothed voltage obtained from a divided voltage of the first output voltage by suppressing a pulsation component via a first power-supply filter, and the smoothed voltage takes a value not greater than a lowest value of a pulsation of the reference voltage due to a set dividing ratio of the divided voltage;
        the unsmoothed power-supply monitor signal being a divided voltage of the first output voltage, and the divided voltage takes a value not greater than the lowest value of the pulsation of the reference voltage due to a set dividing ratio of the divided voltage; and
    the micro-processor performs
    cooperating with the program memory,
    calculating a maximum deviation by periodically inputting a digital conversion value of the smoothed power-supply monitor signal or the unsmoothed power-supply monitor signal or the unsmoothed power-supply monitor signal into a shift register formed of the RAM memory, and
    determining an abnormality in the constant-voltage power supply in a case where the calculated maximum deviation exceeds a predetermined threshold value,
    wherein the maximum deviation is a deviation between a maximum value and a minimum value of a latest predetermined number of digital conversion values.

2. The electronic control device according to claim 1, wherein:
    a second or third constant-voltage control circuit portion generates one or both of the second output voltage and a third output voltage among the multiple output voltages respectively, and
    the second or third constant-voltage control circuit portion being separated from the constant-voltage control circuit portion that generates the first output voltage;
        as one of the input signal voltages of the multi-channel A-to-D converter, at least one of a second power-supply monitor signal and a third power-supply monitor signal being used as the power-supply monitor voltage is inputted;
        the second power-supply monitor signal being the second output voltage, and a maximum value of the second output voltage being not greater than a minimum value of the reference voltage;
        the third power-supply monitor signal is a divided voltage of the third output voltage that feeds an input interface circuit and an output interface circuit provided to the main control circuit portion, and a dividing ratio of the divided voltage is set so that a maximum value of the divided voltage takes a value not greater than the minimum value of the reference voltage; and
    the micro-processor
        cooperating with the program memory and periodically inputting the digital conversion value of one of the second power-supply monitor signal and the third power-supply monitor signal into the shift register formed of the RAM memory to calculate an average value of a latest predetermined number of digital conversion values and a maximum deviation, which is a deviation between a maximum value and a minimum value of the latest predetermined number of digital conversion values, and
    determining an abnormality in the constant-voltage power supply in one of cases
    where the calculated maximum deviation exceeds one of a predetermined threshold value and a predetermined band value and
    where both of the calculated maximum deviation and the calculated average value exceed one of respective predetermined threshold values and predetermined band values.

3. The electronic control device according to claim 2, wherein:
    the micro-processor cooperates with the program memory and periodically makes an abnormality determination alternately for at least one of the smoothed power-supply monitor signal and the unsmoothed power-supply monitor signal and at least one of the second power-supply monitor signal and the third power-supply monitor signal, so that more than one abnormality determination is not made in a same control flow.

4. The electronic control device according to claim 1, wherein:
the first output voltage is applied to the reference voltage terminal as the reference voltage and the smoothed power-supply monitor signal to be used as the power-supply monitor voltage is inputted as one of the input signal voltages of the multi-channel A-to-D converter;
the analog sensor group includes
a first analog sensor that operates on the first output voltage as a power supply, a detection signal voltage of the first analog sensor varies in proportion to the first output voltage, and
a second analog sensor that operates on one of the input power-supply voltage and the first output voltage as a power supply, a detection signal voltage of the second analog sensor is not influenced by a pulsation variation of the first output voltage;
input circuits of the first analog sensor and the second analog sensor include bypass capacitors that suppress a foreign high-frequency noise in a band of several MHz to tens MHz, and
noise filters that suppress a noise component of tens Hz to several KHz or higher generated in the input circuits are connected to the input circuits;
among the noise filters, at least the noise filter connected to the first analog sensor is a low-pass filter having a first break frequency; and
the first power-supply filter is a low-pass filter that smoothes a pulsation component of tens Hz to tens KHz or higher, which are pulsation frequencies when the first output voltage is in an abnormal state, and has a second break frequency lower than the first break frequency.

5. The electronic control device according to claim 4, wherein:
the micro-processor cooperates with the program memory and periodically inputs a digital conversion value of a second analog signal, which is at least one of signals of the second analog sensor, into the shift register formed of the RAM memory to calculate a moving average value, which is an average value of a latest predetermined number of digital conversion values, and specifies the calculated moving average value as a digital conversion value for the second analog signal.

6. The electronic control device according to claim 1, wherein:
a voltage is applied from the first output voltage to the reference voltage terminal as the reference voltage by suppressing a pulsation component via the reference power-supply filter, and the unsmoothed power-supply monitor signal to be used as the power-supply monitor voltage is inputted as one of the input signal voltages of the multi-channel A-to-D converter;
the analog sensor group includes
a first analog sensor operating on the first output voltage as a power supply, a detection signal voltage of the first analog sensor varies in proportion to the first output voltage, and
a second analog sensor that operating on one of the input power-supply voltage and the first output voltage as a power supply, a detection signal voltage of the second analog sensor is not influenced by a pulsation variation of the first output voltage;
input circuits of the first analog sensor and the second analog sensor include bypass capacitors that suppress a foreign high-frequency noise in a band of several MHz to tens MHz, and
noise filters that suppress a noise component of tens Hz to several KHz or higher generated in the input circuits are connected to the input circuits;
among the noise filters, at least the noise filter connected to the first analog sensor is a low-pass filter having a first break frequency; and
the reference power-supply filter is a low-pass filter that smoothes a pulsation component of tens Hz to tens KHz or higher, which are pulsation frequencies when the first output voltage is in an abnormal state, and has a break frequency as high as the first break frequency.

7. The electronic control device according to claim 1, wherein:
the first output voltage is applied to the reference voltage terminal as the reference voltage and the smoothed power-supply monitor signal to be used as the power-supply monitor voltage is inputted as one of the input signal voltages of the multi-channel A-to-D converter;
the analog sensor group includes
a first analog sensor that operates on the first output voltage as a power supply, a detection signal voltage of the first analog sensor varies in proportion to a value of the first output voltage, and
a second analog sensor that operates on one of the input power-supply voltage and the first output voltage as a power supply, a detection signal voltage of the second analog sensor is not influenced by a pulsation variation of the first output voltage;
input circuits of the first analog sensor and the second analog sensor include bypass capacitors that suppress a foreign high-frequency noise in a band of several MHz to tens MHz, and
noise filters that suppress a noise component of tens Hz to several KHz or higher generated in the input circuits are connected to the input circuits;
among the noise filters, at least the noise filter connected to the first analog sensor is a low-pass filter having a first break frequency;
the first power-supply filter is a low-pass filter that smoothes a pulsation component of tens Hz to tens KHz or higher, which are pulsation frequencies when the first output voltage is in an abnormal state, and has a second break frequency lower than the first break frequency;
the multi-channel A-to-D converter is divided to multiple multi-channel A-to-D converters, so that the first output voltage is applied to a reference terminal of one multi-channel A-to-D converter as the reference voltage and a voltage is applied from the first output voltage to a reference terminal of the other multi-channel A-to-D converter as the reference voltage by suppressing a pulsation component via the reference power-supply filter;
an input signal obtained from the first analog sensor is inputted into an analog input terminal of the one multi-channel A-to-D converter with a priority as a first analog signal; and an input signal obtained from the second analog sensor is inputted into an analog input terminal of the other multi-channel A-to-D converter with a priority as a second analog signal.

* * * * *